(12) United States Patent
Hitomi et al.

(10) Patent No.: US 9,328,688 B2
(45) Date of Patent: May 3, 2016

(54) SUPERCHARGED DIRECT FUEL INJECTION ENGINE

(75) Inventors: Mitsuo Hitomi, Hiroshima (JP);
Masahisa Yamakawa, Hiroshima (JP);
Toshiaki Nishimoto, Hiroshima (JP);
Takashi Youso, Hiroshima (JP); Keiji Araki, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 1227 days.

(21) Appl. No.: 12/749,388

(22) Filed: Mar. 29, 2010

(65) Prior Publication Data
US 2010/0242899 A1    Sep. 30, 2010

(30) Foreign Application Priority Data

Mar. 31, 2009    (JP) ................................ 2009-086953

(51) Int. Cl.
| F02B 3/00 | (2006.01) |
| G06F 17/00 | (2006.01) |
| F02D 41/30 | (2006.01) |
| F02D 41/40 | (2006.01) |

(52) U.S. Cl.
CPC .......... *F02D 41/3035* (2013.01); *F02D 41/402* (2013.01); *Y02T 10/128* (2013.01); *Y02T 10/44* (2013.01)

(58) Field of Classification Search
CPC .. F02D 41/3035; F02D 41/402; Y02T 10/128
USPC .............. 123/299, 300, 304, 305, 316, 559.1, 123/564, 565; 701/101–105
See application file for complete search history.

(56) References Cited

U.S. PATENT DOCUMENTS

| 6,293,246 | B1 | 9/2001 | Tanahashi et al. |
| 6,957,640 | B1 * | 10/2005 | Liu et al. ........................ 123/305 |
| 7,194,996 | B2 * | 3/2007 | Koopmans ..................... 123/295 |
| 7,669,578 | B2 * | 3/2010 | Yamashita et al. ............. 123/295 |

(Continued)

FOREIGN PATENT DOCUMENTS

| EP | 1031722 A2 | 8/2000 |
| EP | 1435445 A1 | 7/2004 |

(Continued)

OTHER PUBLICATIONS

ISA European Patent Office, Search Report of EP 10 00 3474, Jun. 11, 2010, Germany, 5 pages.

*Primary Examiner* — David Hamaoui
(74) *Attorney, Agent, or Firm* — Alleman Hall McCoy Russell & Tuttle LLP

(57) ABSTRACT

Various systems and methods are disclosed for controlling an internal combustion engine system having an internal combustion engine, a fuel injector which directly injects fuel into a combustion chamber of the internal combustion engine, and a supercharger which supercharges air into the combustion chamber. One example method comprises, injecting fuel into the combustion chamber multiple times so that a first part of the fuel is self ignited and a last part of the fuel being injected during the compression stroke or later in a cylinder cycle when a desired torque of said internal combustion engine system is in a first range; and increasing a pressure of air which the supercharger charges into the combustion chamber as amount of fuel injected into the combustion chamber during a cylinder cycle increases when the desired torque is in the first range.

13 Claims, 14 Drawing Sheets

(56) References Cited

U.S. PATENT DOCUMENTS

| | | | | |
|---|---|---|---|---|
| 7,717,084 B2* | 5/2010 | Kurotani | ............... | F02B 1/08 123/295 |
| 7,963,268 B2* | 6/2011 | Kang | ............... | F01L 1/34 123/294 |
| 7,992,542 B2* | 8/2011 | Glugla et al. | ............... | 123/406.2 |
| 8,047,172 B2* | 11/2011 | Nakamura et al. | ............... | 123/143 B |
| 8,156,920 B2* | 4/2012 | Christ et al. | ............... | 123/295 |
| 8,474,432 B2* | 7/2013 | Storhok et al. | ............... | 123/299 |
| 8,544,444 B2* | 10/2013 | Hitomi | ............... | F02D 13/0238 123/294 |
| 2001/0002538 A1 | 6/2001 | Katsuta et al. | | |
| 2003/0217733 A1 | 11/2003 | Shiraishi et al. | | |
| 2006/0219215 A1* | 10/2006 | Brachert et al. | ............... | 123/299 |
| 2007/0028890 A1 | 2/2007 | Brown et al. | | |
| 2007/0240920 A1* | 10/2007 | Holmes et al. | ............... | 180/65.2 |
| 2009/0234556 A1* | 9/2009 | Kang et al. | ............... | 701/102 |
| 2010/0242901 A1* | 9/2010 | Seto | ............... | F02D 13/0207 123/299 |
| 2014/0251252 A1* | 9/2014 | Wasada | ............... | F02M 31/042 123/184.21 |

FOREIGN PATENT DOCUMENTS

| | | |
|---|---|---|
| JP | 11-210539 | 8/1999 |
| JP | 2001-182601 A | 7/2001 |
| JP | 2001-280168 A | 10/2001 |
| JP | 2002-276442 | 9/2002 |
| JP | 2003-106178 A | 4/2003 |
| JP | 2003-343312 A | 12/2003 |
| JP | 2006-161736 A | 6/2006 |
| WO | 9942718 | 8/1999 |

* cited by examiner

SUPERCHARGED DIRECT FUEL INJECTION ENGINE

BACKGROUND

The present description relates to an internal combustion engine having homogeneous charge compression ignition (HCCI) combustion, and more particularly to a HCCI engine with a supercharger and direct fuel injection.

There is known, and, for example, described in Japanese patent application publication no. 2002-276442A2, a spark assisted HCCI combustion process. The Japanese publication discloses a method comprising the steps of injecting first stage fuel from an intake stroke to an early compression stroke of a cylinder cycle, igniting the first stage fuel by a spark to start first stage combustion, injecting second stage fuel, combusting a part of the second stage fuel by continuing the first stage combustion of the first stage fuel, and igniting the remaining part of the second stage fuel using greater heat and higher temperature created by the earlier combustion to make the second stage combustion.

The prior method can reliably control self ignition timing since the first stage combustion is started by the spark ignition to actively control the temperature in the combustion chamber. However, the spark assisted HCCI combustion may not have some of advantages the HCCI combustion can inherently have. Specifically, for the spark ignition of the first stage fuel, it needs to have a relatively fuel rich mixture around the spark plug. This means a greater amount of fuel is consumed, which deteriorates operating efficiency. Also, the fuel rich mixture may create more heat for a longer period of the spark ignited combustion than the HCCI combustion. The longer, hotter condition may create more nitrogen oxide, which deteriorates emission control performance.

Therefore, there is room for improvement of operating efficiency and emission control performance of HCCI engines while reliably controlling self ignition timing.

SUMMARY

The inventors herein have rigorously studied to improve operating efficiency and emission control performance and unexpectedly found a method to control an internal combustion engine which solves disadvantages of the prior method and presents further advantages.

Accordingly, there is provided, in one aspect of the present description, a method of controlling an internal combustion engine system having an internal combustion engine, a fuel injector which directly injects fuel into a combustion chamber of the internal combustion engine, and a supercharger which supercharges air into the combustion chamber. The method comprises injecting fuel into the combustion chamber multiple times so that the first part of the fuel is self ignited and the last part of the fuel being injected during the compression stroke or later in the cylinder cycle when a desired torque of the internal combustion engine system is in a first range. The method further comprises increasing a pressure of air which the supercharger charges into the combustion chamber as an amount of fuel injected into the combustion chamber during a cylinder cycle increases when the desired torque is in the first range.

According to the first aspect, by supercharging air into the combustion chamber, the pressure and temperature in the combustion chamber at the ignition are raised enough to let a smaller amount of the first part of the fuel be self ignited. Therefore, the fuel for the initial ignition can be reduced. Since compression ignited combustion lasts shorter than spark ignited combustion, less nitrogen oxide is generated.

Further, by increasing the pressure of the air supercharged into the combustion chamber as the amount of fuel injected into the combustion chamber during a cylinder cycle increases, a greater amount of air can be charged in the combustion chamber so as to keep a leaner air fuel ratio in the combustion chamber and keep the higher heat efficiency HCCI combustion achieves with the leaner air fuel ratio.

Still further, it can suppress an engine noise issue caused by rapid increase of combustion pressure and a reliability issue caused by an increased peak combustion pressure. Specifically, if the same amount of fuel combusts, a compression ignited combustion lasts shorter. Therefore, combustion pressure rises more rapidly and the peak pressure is higher in a compression ignited combustion than in a spark ignited combustion. According to the first aspect, by injecting fuel multiple times during a cylinder cycle so that the first part of the fuel is self ignited and the last part of the fuel is injected during a compression stroke or later in the cylinder cycle, multiple compression ignited combustions occur. Each of the compression ignited combustions generates less heat than when a single compression ignited combustion occurs. Therefore, the combustion speed can be slowed, and the peak combustion pressure can be reduced.

As a result, according to the first aspect, the engine operating range where the compression ignited combustion is made can be extended to a greater torque side while improving the operating efficiency and the emission control performance and without raising the noise and reliability issues.

In some embodiments, the supercharger may have a capacity of supercharging into the combustion chamber twice or more of the air mass at the atmospheric pressure. The method may further comprise, controlling the total amount of fuel injected during a cylinder cycle so that an excess air ratio is 2 or greater in the combustion chamber, when a desired torque for the internal combustion engine system is in the first range. Accordingly, the method can increase the engine output with the greater amount of air while presenting higher operating efficiency derived from the HCCI combustion.

Further, in some embodiments, the method may comprise, when a desired torque for the internal combustion engine system is in a second range, which is smaller than the first range, injecting fuel into the combustion chamber so as to complete the fuel injection by a middle stage of a compression stroke at the latest in a cylinder cycle, and causing combustion of the injected fuel by its compression self-ignition. Accordingly, it can further improve the operating efficiency of the HCCI engines. Specifically, in the relatively lower torque range, the amount of fuel is smaller and the injected fuel is less likely to be ignited too early so that the fuel injection can be completed earlier to get a longer period for mixing air and fuel.

Still further, in some embodiments, the method may comprise controlling an effective compression ratio of the combustion chamber to be 15 or greater when a desired torque for the internal combustion engine system is in the first range. Accordingly, the greater compression ratio can raise the temperature in the combustion chamber to reliably ignite the leaner fuel. As a result, the engine operating efficiency can be further improved.

Still further, in some embodiments, the method may comprise, when a desired torque for the internal combustion engine system is in a third range, which is greater than the first range, making an air fuel ratio leaner than the stoichiometric air fuel ratio and igniting fuel injected in the combustion chamber with multiple sparks or a plasma jet. Accordingly, the greater amount of air enables the engine to output enough torque as desired, and the lean air fuel mixture can be ignited in a controlled manner to improve the engine operating efficiency.

BRIEF DESCRIPTION OF THE DRAWINGS

FIG. 8A shows a fuel injection amount and FIG. 8B shows the combustion pressure.

FIG. 9A shows the fuel injection amount and FIG. 9B shows the combustion pressure.

FIG. 10A shows the fuel injection amount and FIG. 10B shows the combustion pressure.

DETAILED DESCRIPTION OF THE EMBODIMENTS

Figure 1:
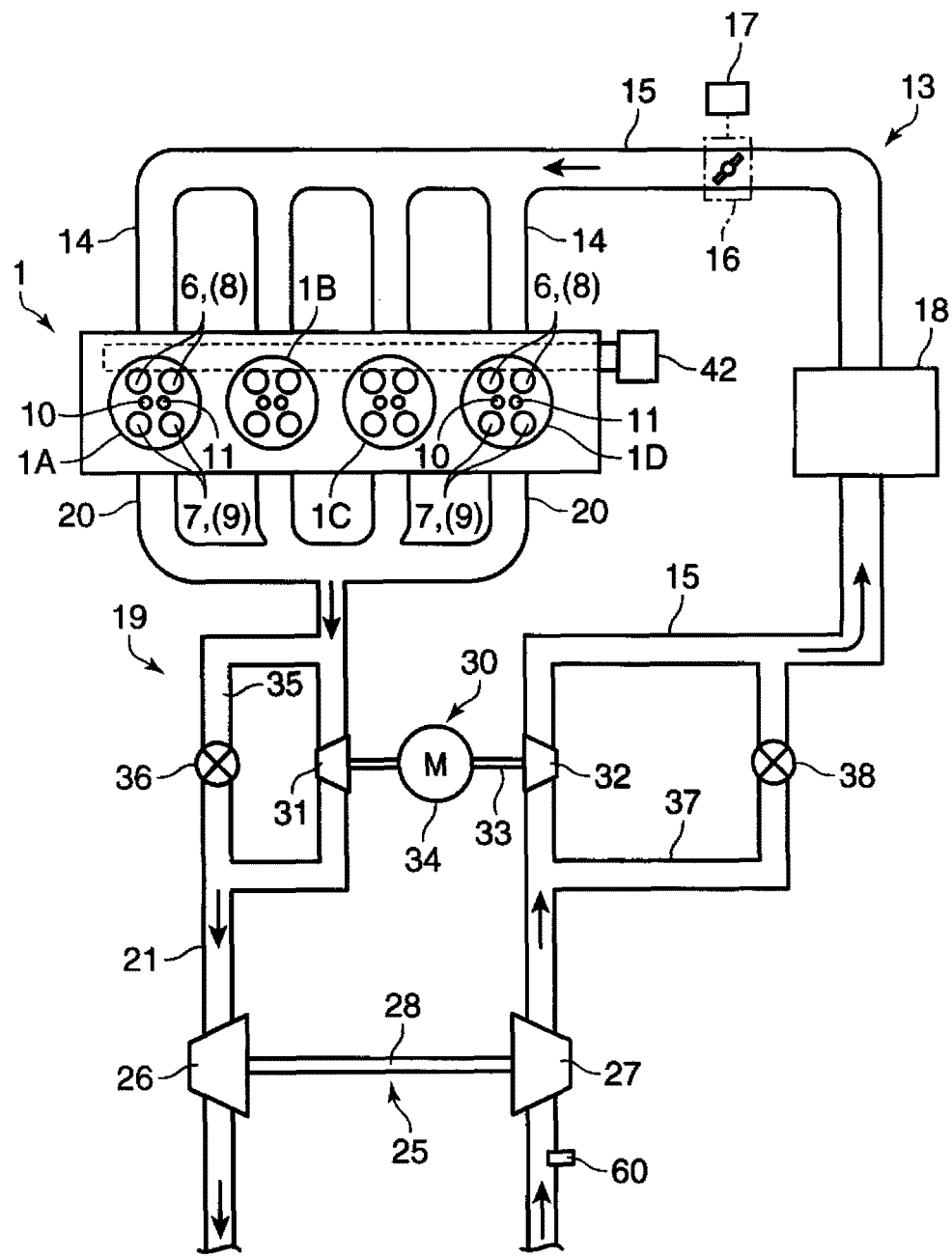
FIG. 1 is a view showing the entire configuration of a direct injection engine provided with a supercharger according to an embodiment of the present invention.
Figure 2:
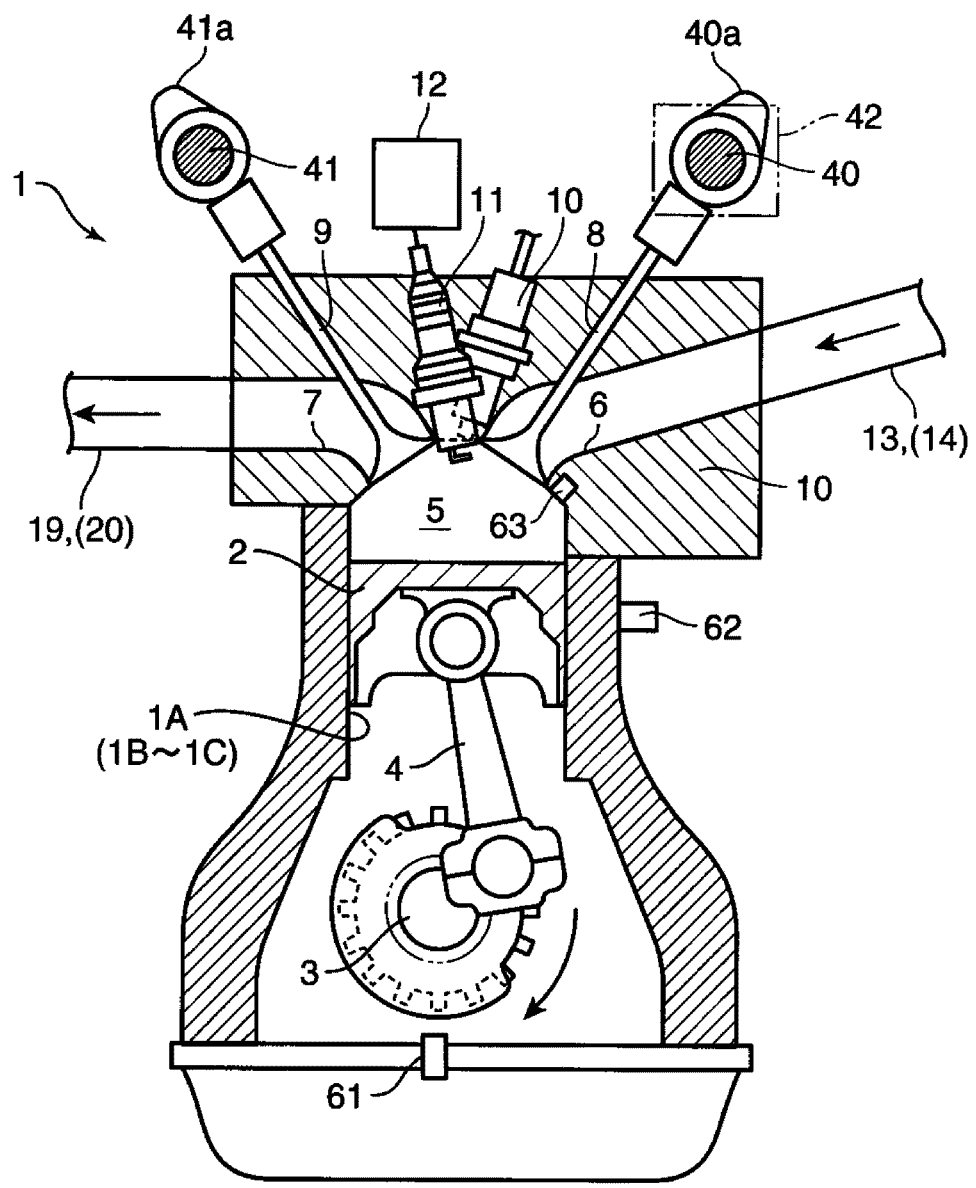
FIG. 2 is a cross-sectional view of a main part of the engine.

FIG. 1 is a view showing an entire configuration of a direct injection engine provided with a supercharger according to an embodiment of the present invention, and FIG. 2 is a cross-sectional view showing a specific configuration of a main part 1 of the engine. The engine shown in these drawings is a multi-cylinder gasoline engine, and two or more cylinders are provided to the main part 1 of the engine (in this example, four cylinders 1A-1D are provided). A piston 2 (FIG. 2) is fitted in each of the cylinders 1A-1D. The pistons 2 are coupled to a crankshaft 3 via respective connecting rods 4, and the crankshaft 3 rotates around its axis associated with reciprocating movement of the pistons 2.

A combustion chamber 5 is formed above each of the pistons 2, two inlet ports 6 and two exhaust ports 7 open from each combustion chamber 5. An intake valve 8 and an exhaust valve 9 for opening and closing the respective ports 6 and 7 are provided in an upper part of the main part 1 of the engine. The illustrated engine is so-called a "double overhead camshaft (DOHC) engine," and two pairs of the intake valves 8 and the exhaust valves 9 are provided to each cylinder. Camshafts 40 and 41 (FIG. 2) that rotate so as to interlock with the crankshaft 3 are provided above the intake valves 8 and the exhaust valves 9. The intake and exhaust valves 8 and 9 are individually driven so that they are opened and closed by two or more cams 40a and 41a attached to the respective camshafts 40 and 41.

A VVT 42 is provided to the main part 1 of the engine, as a variable valve timing mechanism for allowing the intake valves 8 to change their close timings.

The VVT 42 is constituted with a variable phase mechanism, and it is configured so that a rotation phase of the intake camshaft 4 can be changed with respect to the crankshaft 3 according to an engine operating state, for example. Because various structures of the VVT 42 are conventionally known, their detailed descriptions are omitted herein for the sake of simplifying the description. However, for example, between cam pulleys and camshafts to which rotation of the crankshaft is transmitted via a timing belt, a member for phase change which enables relative rotation of both is incorporated, and this member has a structure which is driven hydraulically or electrically.

Note that a variable mechanism for changing the close timing of the intake valve 8 by changing a valve lift may be provided as the variable valve timing mechanism. Further, by using a combination of such a variable valve lift mechanism and variable phase mechanism, it may be able to simultaneously perform a change control of an effective compression ratio and a control of an overlapping amount of the intake and exhaust valves 8 and 9.

As shown in FIG. 2, an engine speed sensor 61 for detecting a rotation speed of the crankshaft 3, a water temperature sensor 62 for detecting a temperature of engine cooling water, and an inside-cylinder pressure sensor 63 for detecting a pressure inside the combustion chamber 5 are provided to the main part 1 of the engine.

As shown in FIGS. 1 and 2, an injector 10 for injecting fuel directly into each combustion chamber 5, and a spark plug 11 for discharging a spark for ignition in the combustion chamber 5 is provided per cylinder in the main part 1 of the engine. Note that, in the illustrated example, the injector 10 and the spark plug 11 are both arranged near the center of the upper part of the combustion chamber 5. That is, the injector 10 and the spark plug 11 are arranged close to each other so that their tip ends are both located near the center of the upper part of the combustion chamber 5, and are mounted so that they face toward the combustion chamber 5 from obliquely upward in a posture in which they incline at mutually different angles in order to avoid interference with each other.

The spark plug 11 is electrically coupled to an ignition circuit device 12 for generating electric power for spark discharge, and a spark is discharged from the spark plug 11 at predetermined timings according to the power supply from the ignition circuit device 12. In this embodiment, the ignition circuit device 12 performs so-called multiple ignition in which sparks are successively discharged from the spark plug 11 two or more times.

The injector 10 has a structure in which it can inject fuel (gasoline) at a quite greater injection pressure than that of a typical injector used for a gasoline engine. The injection pressure of the typical injector used by the direct injection gasoline engine is about 20 MPa, and on the other hand, the injector 10 of this embodiment can inject fuel at a high injection pressure of 100 MPa or more.

In order to inject a high-pressurized fuel as described above, it is possible to adopt a common-rail system (a system in which fuel pumped from a fuel feed pump is pressurized at a high pressure by a common rail for pressure accumulation, and is then supplied to an injector) recently used in the field of diesel engines, for example. Of course, various systems other than the common-rail system may be employed as long as the high-pressure injection pressure of 100 MPa or more can be obtained.

The injector 10 is a multiple-nozzle injector provided with two or more jet nozzles in its nozzle point part. This is to facilitate microatomization of fuel inside the combustion chamber 5 by injecting the high-pressurized fuel and distributing it from two or more jet nozzles.

In order to inject fuel from the injector 10 accurately at necessary timings, in this embodiment, an injector using a piezoelectric element already put in practical use in fields, such as the common-rail type diesel engine, is used as the injector 10, for example. That is, in the engine of this embodiment, because a precise fuel injection control is required such as injecting fuel in two or more steps within a predetermined engine operating range (described later in detail), the electronically controlled injector using the piezoelectric element which can switch ON/OFF at a very high speed is used as the injector 10. Thereby, an injection period of time and an injection timing of the fuel injected from the injector 10 can be controlled with a higher accuracy.

Referring to a feature of the engine of this embodiment which is different from the typical gasoline engine, it has a compression ratio set considerably higher. A geometric compression ratio of the typical direct injection gasoline engine is set at about 9 to 11; however, a geometric compression ratio of the engine of this embodiment is set at about 18. Note that a substantial compression ratio determined based on close timings of the intake valve 8 (effective compression ratio) is variably set within a compression ratio range of 18 or less, as described later.

The entire configuration of the engine is again described using FIGS. 1 and 2. An intake passage 13 and an exhaust passage 19 are connected with the inlet port 6 and the exhaust port 7 of the main part 1 of the engine, respectively.

The intake passage 13 is a passage for supplying air for combustion to the combustion chamber 5. As shown in FIG. 1, it has two or more branch passage parts 14 which are branched for each cylinder, and a common passage part 15 provided at the upstream side, commonly for all the cylinders.

The exhaust passage 19 is a passage for discharging combusted gas (exhaust gas) generated in the combustion chamber 5. It is provided with two or more branch passage parts 20 which are branched for each cylinder, and a common passage part 21 provided at the downstream side, commonly for all the cylinders similar to the intake passage 13.

An airflow sensor 60 for detecting a flow rate of intake air which passes through the common passage part 15 is provided upstream of a compressor 27 (described later) in the common passage part 15 of the intake passage 13.

A throttle valve 16 for adjusting an amount of the intake air is provided in the common passage part 15. The throttle valve 16 is an electronically controlled throttle valve driven by an actuator 17 so as to open and close. That is, a gas pedal sensor 64 (FIG. 3) is provided to a gas pedal (not illustrated) onto which a driver steps on to operate it. An ECU 50 (FIG. 3) described later calculates a suitable opening of the throttle valve 16 according to a detection value of the sensor (that is, a detected opening of the gas pedal), an engine operating state, etc. A drive signal according to the opening is then inputted into the actuator 17 to open and close the throttle valve 16.

As shown in FIG. 1, two superchargers of a large-sized supercharger 25 and a small-sized supercharger 30 are provided to the engine of this embodiment.

The large-sized supercharger 25 includes a turbine 26 provided in the common passage part 21 of the exhaust passage 19, a compressor 27 provided in the common passage part 15 of the intake passage 13, and a coupling shaft 28 that couples the turbine 26 to the compressor 27. When the turbine 26 rotates by receiving energy of exhaust gas, the compressor 27 interlocks with the rotation and thus rotates at a high speed to pressurize air (intake air) passing through the intake passage 13 to feed the compressed air to the combustion chamber 5. Note that the compressor 27 is constituted with a relatively large-sized impeller and, thus, the large-sized supercharger 25 that compresses the intake air by such a large-sized compressor 27 demonstrates mainly a high supercharge performance in a high-rotation and high-load range where the energy of exhaust gas is large.

The small-sized supercharger 30 includes a turbine 31 provided in the common passage part 21 of the exhaust passage 19, a compressor 32 provided in the common passage part 15 of the intake passage 13, a coupling shaft 33 that connects the turbine 31 to the compressor 32, and an electric motor 34 that rotates the coupling shaft 33. Note that the compressor 32 of the small-sized supercharger 30 includes an impeller smaller than the compressor 27 of the large-sized supercharger 25. For this reason, the compressor 32 is rotated relatively easily to pressurize the intake air even in an operating range where the energy of exhaust gas is not so large. Moreover, for example, when an engine load increases rapidly from a low-rotation and low-load range by acceleration of the engine, the electric motor 34 operates as needed to assist rotation of the compressor 32 to perform supercharging with a quick response.

A first bypass pipe 35 for bypassing the turbine 31 of the small-sized supercharger 30 is provided in the common passage part 21 of the exhaust passage 19. A first bypass valve 36 is provided to the first bypass pipe 35 to switch exhaust routes by opening and closing the valve 36. That is, when the first bypass valve 36 is opened, exhaust gas flows into the turbine 31 to rotate the turbine 31 and the compressor 32. On the other hand, when the first bypass valve 36 is closed, exhaust gas mainly passes through the first bypass pipe 35 (that is, the turbine 31 is bypassed) to control the rotation of the turbine 31.

Similarly, a second bypass pipe 37 for bypassing the compressor 32 of the small-sized supercharger 30 is provided in the common passage part 15 of the intake passage 10. A second bypass valve 38 is provided to the second bypass pipe 37 to switch air intake courses by opening and closing the valve 38. That is, when the bypass valve 38 is opened, the intake air flows into the compressor 32 to be pressurized, and, on the other hand, when the second bypass valve 38 is closed, the intake air mainly passes through the second bypass pipe 37 to bypass the compressor 32.

An intercooler 18 for cooling air which is increased in temperature by the supercharger is provided downstream of the compressor 32 in the common passage part 15 of the intake passage 13.

Figure 3:
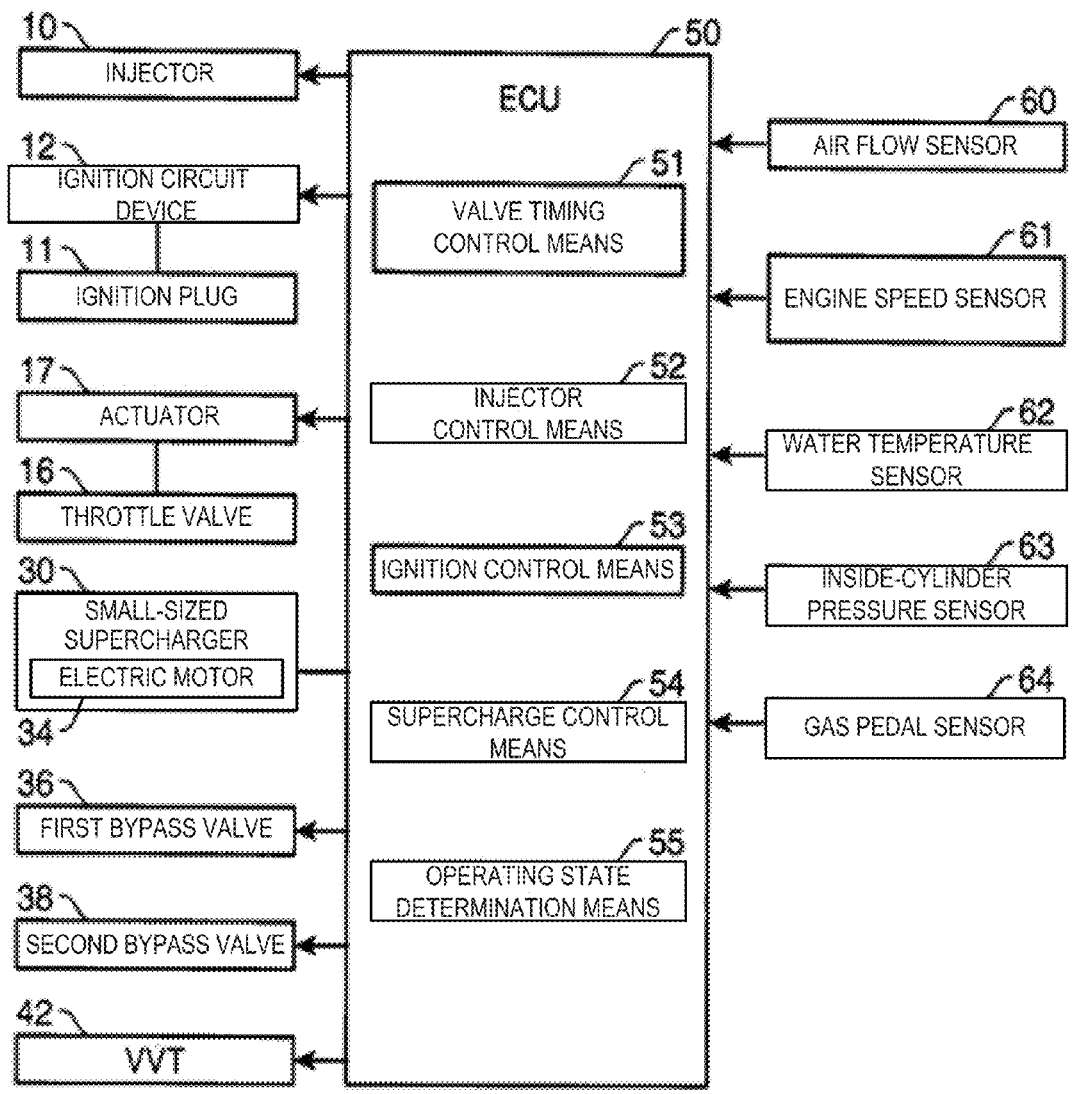
FIG. 3 is a block diagram showing a control system of the engine.

FIG. 3 is a block diagram showing an engine control system. The ECU 50 shown in this figure is a control device for integrally controlling each component of the engine, and typically includes a CPU, a ROM, a RAM and the like, which are well-known in the art.

Detection signals are inputted into the ECU 50 from various sensors. That is, the ECU 50 is electrically coupled to the airflow sensor 60, the engine speed sensor 61, the water temperature sensor 62, the inside-cylinder pressure sensor 63, and the gas pedal sensor 64, and detection signals from these various sensors are discretely inputted into the ECU 50.

The ECU 50 is also electrically connected with the injector 10, the ignition circuit device 12 for the spark plug 11, the actuator 17 for the throttle valve 16, the electric motor 34 for the small-sized supercharger 30, the first bypass valve 36 and the second bypass valve 38, and the VVT 42. The ECU 50 outputs to these devices the control signals for driving the same.

Figure 4:
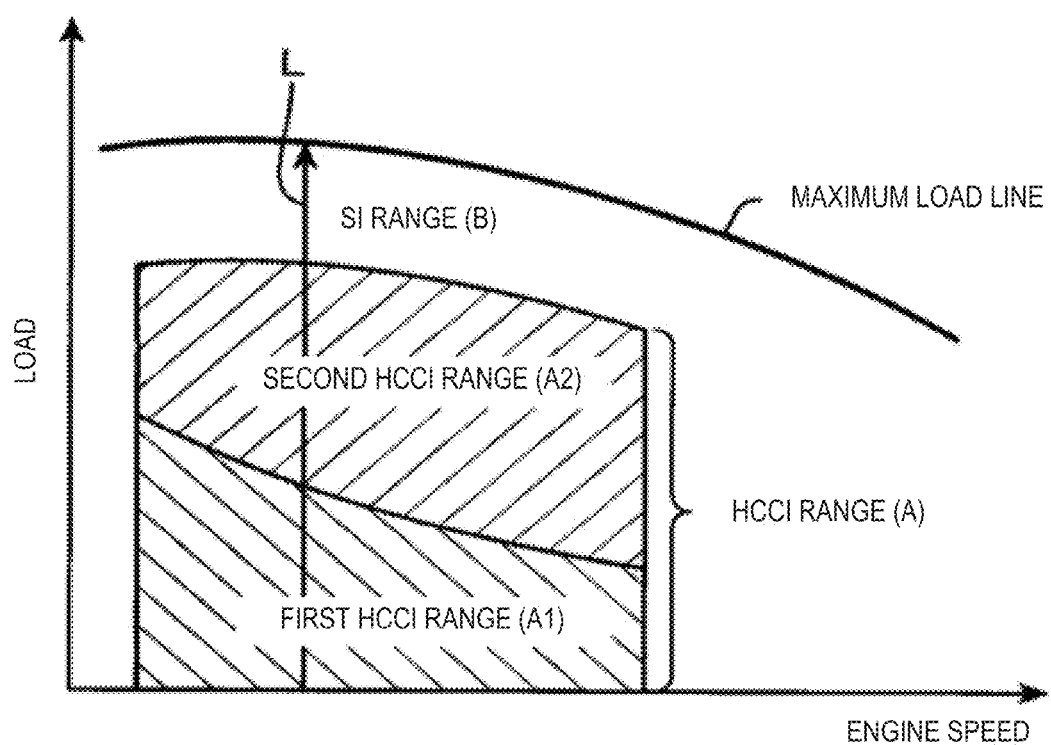
FIG. 4 is a graph showing an example of a control map to be referred to when controlling the engine.

FIG. 4 is a graph showing a control map to which the ECU 50 refers when it controls the engine. In this graph, an HCCI range (A) set as a relatively wide range except the high-rotation and high-load range is an operating range where combustion by compressed self ignition is performed, and an SI range (B) set as ranges other than the range (A) is an operating range where combustion by jump spark ignition is performed. That is, in the HCCI range (A), combustion is controlled so that air fuel mixture generated by fuel being injected during an intake stroke self-ignites around a compression top dead center, and on the other hand, in the SI range (B), air fuel mixture is forcibly ignited by jump sparks from the spark plug 11 and the flame then propagates to cause combustion.

The HCCI range (A) is divided into two ranges (A1) and (A2) according to a difference of combustion conditions, such as a compression ratio and an air fuel ratio. That is, if a lower load side is referred to as a "first HCCI range (A1)" and a higher load side is referred to as a "second HCCI range (A2)," combustion by compressed self ignition is performed in both the first and second HCCI ranges (A1) and (A2) after the combustion conditions, such as the compression ratio and an air fuel ratio, are changed. In this embodiment, by carrying out combustion by compressed self ignition while changing the combustion conditions in a various way, the operating range where compressed self ignition is possible is expanded relatively to a higher load side. Note that, for correspondence with the claims, the second HCCI range (A2) corresponds to a "supercharge HCCI range (first range)" in the claims, and the first HCCI range (A1) corresponds to a "lower load range than the supercharge HCCI range in the HCCI range (second range which is smaller than said first range)" according to the invention.

Returning to FIG. 3, specific functions of the ECU 50 are described. The ECU 50 includes, as its main functional elements, a valve timing control means 51, an injector control means 52, an ignition control means 53, a supercharge control means 54, and an operating state determination means 55.

By controlling operation of the VVT 42, the valve timing control means 51 suitably changes a close timing of the intake valve 8 according to the engine operating state. That is, the intake valve 8 is usually closed near an intake bottom dead center on the retard side (at a timing at which it slightly passed the intake bottom dead center). However, depending on the engine operating state, the VVT 42 is driven by the valve timing control means 51 and the close timing of the intake valve 8 is set so as to be significantly delayed from the intake bottom dead center. Thereby, a substantial start timing of a compression stroke is delayed to reduce a substantial compression ratio (effective compression ratio) of the engine. For this reason, in this embodiment, a means for variably setting an engine compression ratio is constituted from the VVT 42 that changes the close timing of the intake valve 8 and the valve timing control means 51 for controlling operation of the valve. Note that, as described above, because the geometric compression ratio of the engine of this embodiment is about 18, the effective compression ratio is variably set within a range of about 18 or less according to the control operations of the VVT 42 and the valve timing control means 51.

The injector control means 52 controls injection operation of fuel by the injector 10 to control an injection period of time (injection amount) and/or an injection timing of fuel injected into the combustion chamber 5 from the injector 10. More specifically, in the engine of this embodiment where the compression ratio is set considerably high, the injector control means 52 suitably changes the injection timing of the fuel from the injector 10 based on the engine operating state to control an increasing rate of the combustion pressure inside the cylinder (an inside-cylinder pressure produced by combustion of air fuel mixture).

That is, in the engine of this embodiment where its compression ratio is quite higher than that of a typical gasoline engine and combustion by compressed self ignition is performed in a relatively wide operating range, there is a possibility that a large noise and/or vibrations occur in the high load range by the combustion pressure inside the cylinder being rapidly increased. Thus, in this embodiment, when the engine load increases to some extent, the injection timing of fuel from the injector 10 is changed to a timing such that combustion inside the combustion chamber 5 is slowed based on the control by the injector control means 52 to reduce the increasing rate of the combustion pressure.

The ignition control means 53 controls the power supply to the spark plug 11 from the ignition circuit device 12 to control the timing of the spark discharge by the spark plug 11.

The supercharge control means 54 controls operation of the electric motor 34 or the first and second bypass valves 36 and 38 to control the amounts of air supercharged by the large-sized supercharger 25 and the small-sized supercharger 30 (the supercharge amounts).

The operating state determination means 55 determines whether the engine operating state identified from the engine load (required torque) or the rotation speed based on the detection values of the various sensors 60 to 64 corresponds to which position in the control map shown in FIG. 4. This determination result is reflected to contents of the control performed by each of the control means 51-54. That is, when the engine operating state is determined by the operating state determination means 55, the control for driving each part of the engine (for example, the VVT 42, the injector 10, the ignition circuit device 12, the electric motor 34, etc.) under the conditions corresponding to the determination result is performed by the valve timing control means 51, the injector control means 52, the ignition control means 53, and the supercharge control means 54, respectively.

Figure 5:
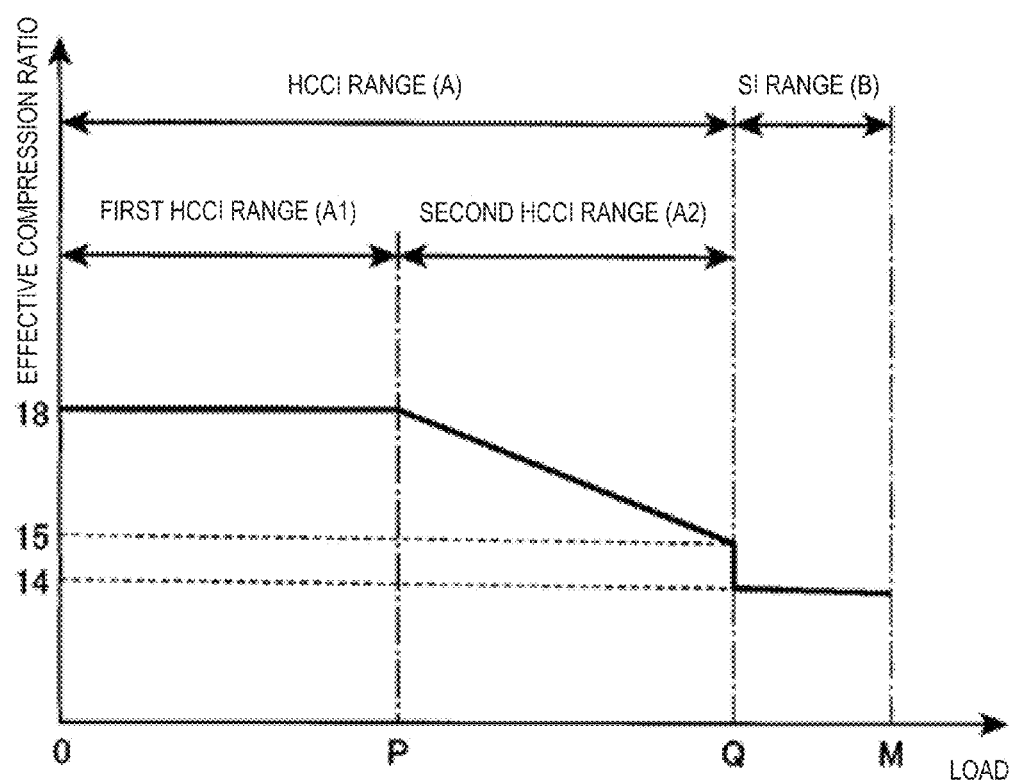
FIG. 5 is a graph showing a change in an effective compression ratio in accordance with an engine load.
Figure 6:
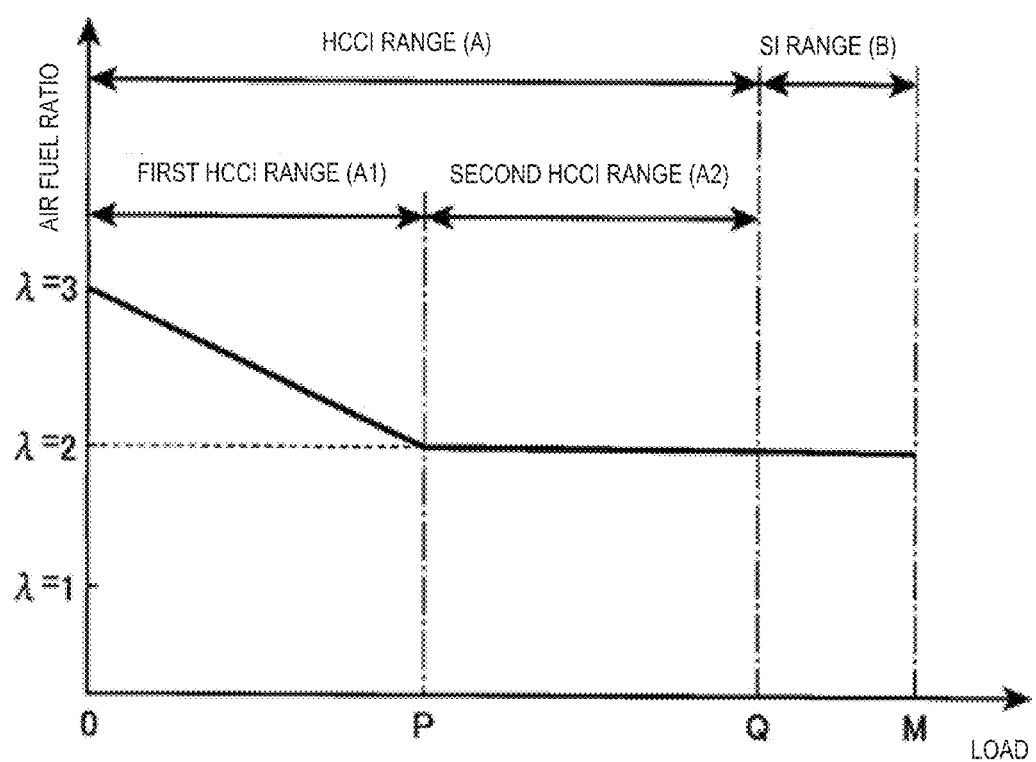
FIG. 6 is a graph showing a change in an air fuel ratio in accordance with the engine load.
Figure 7:
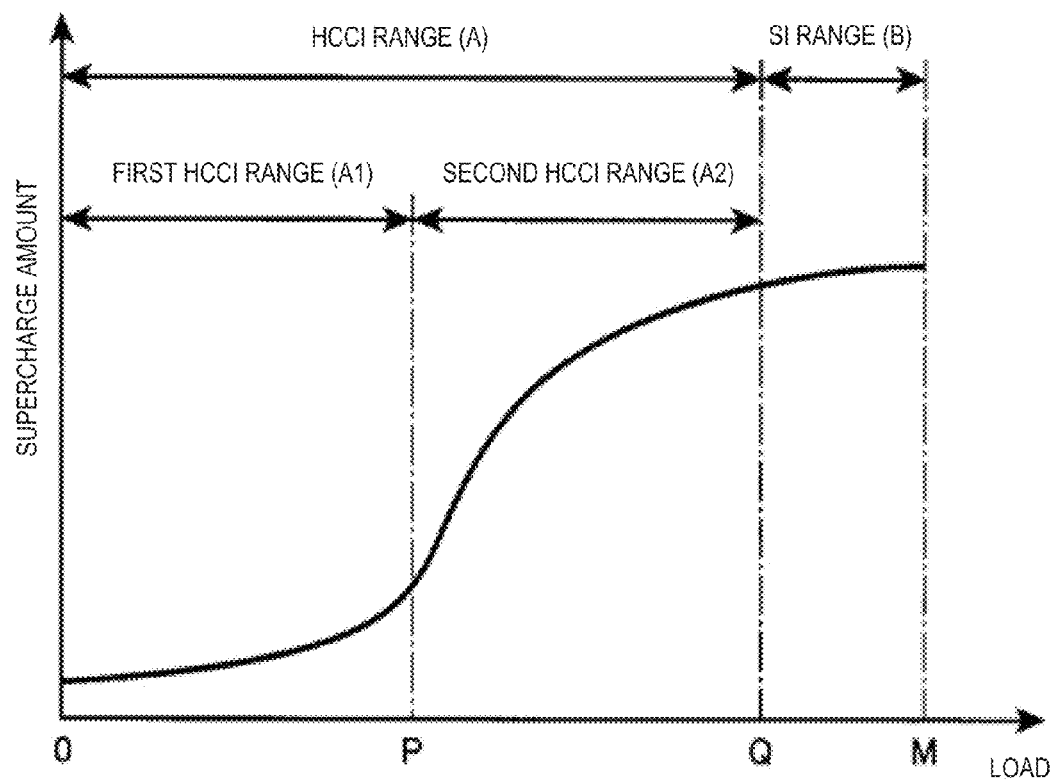
FIG. 7 is a graph showing a change in a supercharge amount in accordance with the engine load.

FIGS. 5 to 7 are graphs showing control examples of the compression ratio (effective compression ratio), the air fuel ratio, and the supercharge amount in accordance with the engine load. Note that the values, such as the compression ratio and the air fuel ratio, illustrated in these drawings, are values fundamentally during a period while the engine is warm (when the temperature of engine cooling water is greater than a predetermined value), and the value will be suitably changed while the engine is cold, if needed.

Specifically, FIGS. 5 to 7 show how the compression ratio, the air fuel ratio or the like change when the engine operating state changes like a line L in the control map of FIG. 4. The line L of FIG. 4 represents a behavior in which the engine load changes from a non-loaded state to a maximum load state within an engine speed range where the HCCI range (A) exists. For this reason, the engine is first operated with combustion by compressed self ignition, and then shifts to combustion by jump spark ignition with increase of the load.

First, the change in the compression ratio (effective compression ratio) is described using FIG. 5. Note that, in FIG. 5, a loaded point which serves as a boundary of the first HCCI range (A1) and the second HCCI range (A2) is expressed as "P," a loaded point which serves as a boundary of the second HCCI range (A2) and the SI range (B) is expressed as "Q," and the maximum loaded point which serves as an upper limit of the SI range (B) is expresses as "M."

As shown in FIG. 5, for the compression ratio in this embodiment, the effective compression ratio in the first HCCI range (A1) is maintained at about 18, but it is gradually lowered from 18 to about 15 with increase of the load in the second HCCI range (A2), and the effective compression ratio is further lowered to about 14 in the SI range (B). Specifically, from a starting point (non-loaded condition) of FIG. 5 to the loaded point P which is a boundary of the first HCCI range (A1) and the second HCCI range (A2), the effective compression ratio is uniformly maintained at about 18 (that is, it is substantially the same value as the geometric compression ratio), and at a higher load side from the loaded point P, the effective compression ratio is gradually lowered, and it falls to about 15 at the loaded point Q which is a boundary of the second HCCI range (A2) and the SI range (B). Then, the effective compression ratio is further lowered to about 14 bordering on the loaded point Q, and after that, it is maintained at 14 up to the maximum loaded point M.

As described above, gradually lowering the effective compression ratio in the second HCCI range (A2) and the SI range (B) which fall under a higher load side from the loaded point P prevents noises or knocks from occurring by an excessive increase of the inside-cylinder pressure or the inside-cylinder temperature. Note that the above-described change characteristics of the compression ratio can be acquired by control of the close timing of the intake valve 8 by the valve timing control means 51 and the VVT 42.

Next, the change in the air fuel ratio is described using FIG. 6. According to this graph, an excess air ratio $\lambda$ with respect to a theoretical air fuel ratio is variably set within a range of $\lambda=2$ to 3 in the first HCCI range (A1), and the excess air ratio $\lambda$ is maintained constant at $\lambda=2$ (or a neighborhood value exceeding this value) in the second HCCI range (A2) and the SI range (B). That is, according to FIG. 6, a lean air fuel ratio with the excess air ratio of $\lambda=2$ or more is maintained in the entire range of the engine load.

Specifically, the excess air ratio $\lambda$ in the non-loaded condition is first set to $\lambda\approx3$, and the excess air ratio $\lambda$ then falls gradually with increase of the load (that is, the air fuel ratio is made richer), and it becomes $\lambda\approx2$ at the loaded point P which is a boundary of the first HCCI range (A1) and the second HCCI range (A2). On the other hand, the excess air ratio $\lambda$ is maintained constant at $\lambda\approx2$ in the second HCCI range (A2) and the SI range (B) which fall under a higher load side from the loaded point P (that is, a range from the loaded point P to the maximum loaded point M). Note that such a change characteristic of the air fuel ratio can be acquired by control of the injection amount of fuel from the injector 10 by the injector control means 52.

Next, for the supercharge amount, as shown in FIG. 7, the supercharge amount in the first HCCI range (A1) is set lower (that is, air intake near natural-aspiration is performed), and on the other hand, the supercharge amount increases greatly with increase of the load in the second HCCI range (A2) and the SI range (B). That is, in this embodiment, because the excess air ratio $\lambda$ with respect to the theoretical air fuel ratio does not change from $\lambda\approx2$ in the second HCCI range (A2) and the SI range (B), in order to maintain such a lean air fuel ratio and secure the engine output properly (that is, to increase the fuel injection amount), it is necessary to feed a large amount of air into the combustion chamber 5 in both the range (A2) and (B). For this reason, the supercharge amount will be increased greatly.

Specifically, because the excess air ratio $\lambda$ in the second HCCI range (A2) and the SI range (B) is constant at $\lambda\approx2$, by pumping air of which the maximum amount is more than double that of natural-aspiration into the combustion chamber 5 by supercharging, an engine output equivalent to or beyond the engine output at the time of the theoretical air fuel ratio can be obtained. For this reason, in this embodiment, supercharge characteristics of the large-sized supercharger 25 and the small-sized supercharger 30 are set so that air of which the maximum amount is more than double that of natural-aspiration can be supplied to the combustion chamber 5.

Note that, in order to acquire the supercharge characteristics as shown in FIG. 7, the large-sized supercharger 25 and the small-sized supercharger 30 are selectively used as follows, for example. That is, when the engine speed is relatively high, the large-sized supercharger 25 begins to rotate with increase of the load, and when the supercharge amount increases greatly ranging from a middle load to a high load by the action of the large-sized supercharger 25, the supercharge characteristics as shown in FIG. 7 are thus acquired. For this reason, when the engine speed is high, it is not necessary to operate the small-sized supercharger 30 fundamentally, and both the first and second bypass valves 36 and 38 are opened. On the other hand, because the large-sized supercharger 25 does not operate well and a sufficient supercharge effect is not acquired when the engine speed is low even if the load increases, it is necessary to close both the first and second bypass valves 36 and 38 to operate the small-sized supercharger 30. Because the small-sized supercharger 30 excels in responses, it rotates at a sufficient speed with increase of the load even if the engine speed is low, and similar supercharge characteristics to the above can be thereby acquired. At this time, the electric motor 34 operates if needed to assist the rotation of the small-sized supercharger 30.

Here, the conditions in which compressed self ignition occurs are considered briefly. Whether compressed self ignition occurs is dependent on two or more parameters including the temperature, the pressure, the air fuel ratio, etc. Specifically, compressed self ignition occurs easily when the pressure and the temperature are higher, and it occurs easily when the air fuel ratio is richer.

Figure 12:
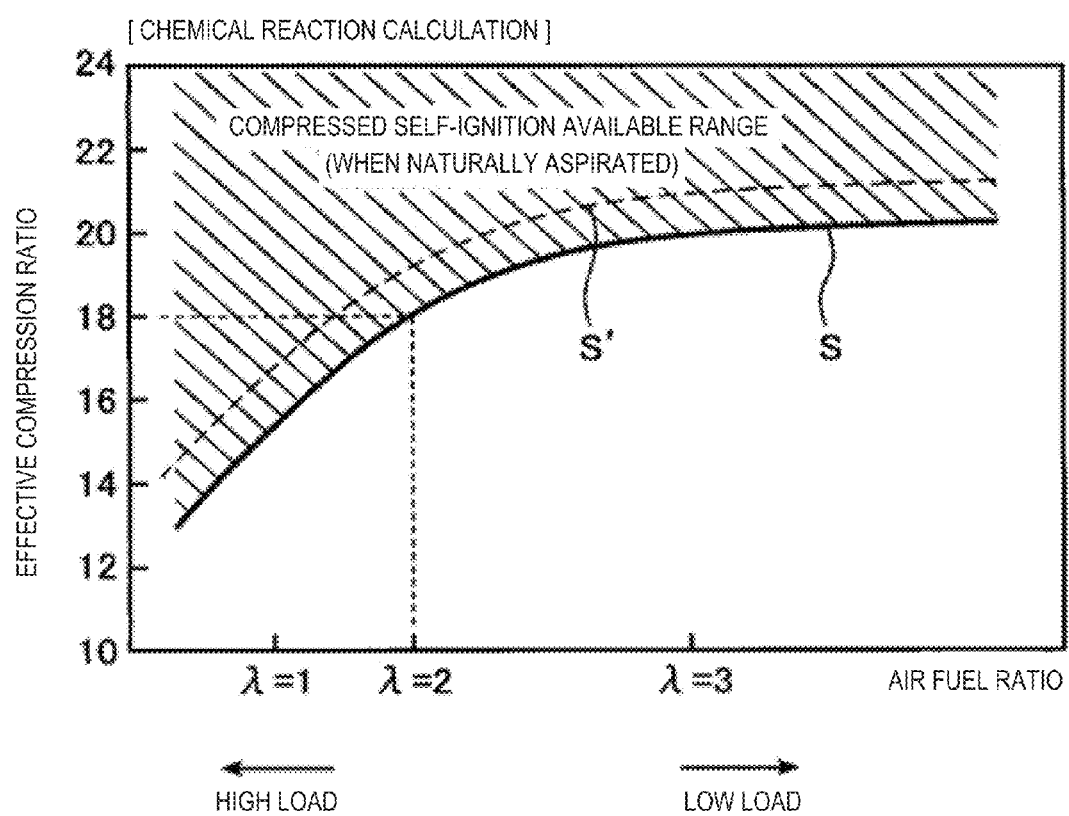
FIG. 12 is a graph showing a range where combustion by compressed self ignition is possible in a naturally-aspirated engine which is not provided with a supercharger.

In FIG. 12, as reference for understanding the characteristics of compressed self ignition, a range where combustion by compressed self ignition is possible in a naturally-aspirated engine which is not provided with a supercharger is shown. In this graph, the horizontal axis represents the excess air ratio $\lambda$ and the vertical axis represents the effective compression ratio, and a line S in the graph represents a lower limit line of the combustion by compressed self ignition which is calculated based on chemical reaction calculation. That is, in a range above the lower limit line S (high compression ratio side), it is theoretically possible to cause compressed self ignition. Note that the lower limit line S herein is based on the chemical reaction calculation performed under a condition where an internal EGR amount (an amount of combusted gas which partially remains in the combustion chamber 5 in order to promote compressed self ignition) is zero.

In a case of the naturally-aspirated engine, because the air fuel ratio is made richer with increase of fuel after the intake air amount reaches the limit, and the engine output is adjusted by changing such an air fuel ratio, the value of λ of the horizontal axis is set so as to be proportional to the engine load. That is, the load is small on the right-hand side of the horizontal axis where λ is large and the air fuel ratio is lean, and the load is large on the left-hand side of the horizontal axis where λ is small and the air fuel ratio is rich.

According to the lower limit line S in FIG. 12, it is found that a larger compression ratio is needed to cause the compressed self ignition as being a lower load side where the air fuel ratio becomes leaner (that is, λ becomes larger). That is, because compressed self ignition will be difficult to occur when the air fuel ratio is lean, in order to cause the compressed self ignition under such a lean air fuel ratio, it is necessary to raise the effective compression ratio to increase the temperature and pressure of the combustion chamber. However, if the effective compression ratio is raised too much, a combusting reaction will be steep and thus causes a problem such as a noise. A line S' of a dashed line in FIG. 12 represents an upper limit of the compression ratio assumed from an aspect of the noise. This upper limit line S' is located relatively near the lower limit line S of compressed self ignition, and from this, it is desirable that compressed self ignition occurs near the lower limit line S as much as possible.

Based on the characteristics of the compressed self ignition described above, the combustion by compressed self ignition performed in this embodiment is verified in more detail. First, in the first HCCI range (A1) set at the low engine load side, as shown in FIGS. 5 and 6, the effective compression ratio λ is set to about 18, and the excess air ratio with respect to the theoretical air fuel ratio is set to λ≈2 to 3. In addition, in the first HCCI range (A1), as shown in FIG. 7, the supercharge amount is seldom raised but air intake is performed in a state close to natural-aspiration.

As understood from FIG. 12, it is originally difficult to automatically cause the compressed self ignition under the above combustion conditions. That is, according to FIG. 12, below a lean air fuel ratio where λ is larger than 2, compressed self ignition is not caused theoretically if the effective compression ratio is not raised to a value larger than 18 (about 20, for example). On the other hand, because the effective compression ratio is set constant at about 18 in the first HCCI range (A1) even under a lean air fuel ratio of λ>2, the temperature and the pressure in the combustion chamber 5 will not rise to a sufficient level for causing compressed self ignition, thereby there is a possibility that a misfire occurs.

Then, in order to reliably cause compressed self ignition also under the above conditions in this embodiment, ignition assistance is performed at least in the lower load range of the first HCCI range A1. The ignition assistance is to auxiliarly carry out spark discharges from the spark plug 11 to promote compressed self ignition before the compressed self ignition starts. Thereby, combustion by compressed self ignition in the first HCCI range (A1) is performed stably, and misfires are prevented reliably.

Because high-pressure fuel of 100 MPa or more is injected into the combustion chamber 5 via two or more jet nozzles from the multiple-nozzle injector 10 in this embodiment, microatomization of the fuel is stimulated to increase flammability of air fuel mixture, and combustion by compressed self ignition can be caused reliably together with the effects by the above ignition assistance.

Next, referring to the second HCCI range (A2), as shown in FIGS. 5 and 6, the effective compression ratio is gradually reduced from 18 to 15 with increase of the load in the second HCCI range (A2); however, the excess air ratio λ is set constant at λ≈2. In addition, in the second HCCI range (A2), as shown in FIG. 7, the supercharge amount increases with increase of the load.

Compressed self ignition will be caused reliably without relying on the ignition assistance if it is under such a combustion condition, unlike in the first HCCI range (A1). That is, because the load of the engine is large (that is, combustion energy is large) and the supercharge amount is large in the second HCCI range (A2), compressed self ignition will be caused automatically without the ignition assistance by relatively increasing the temperature and the pressure in the combustion chamber 5.

Figure 13:
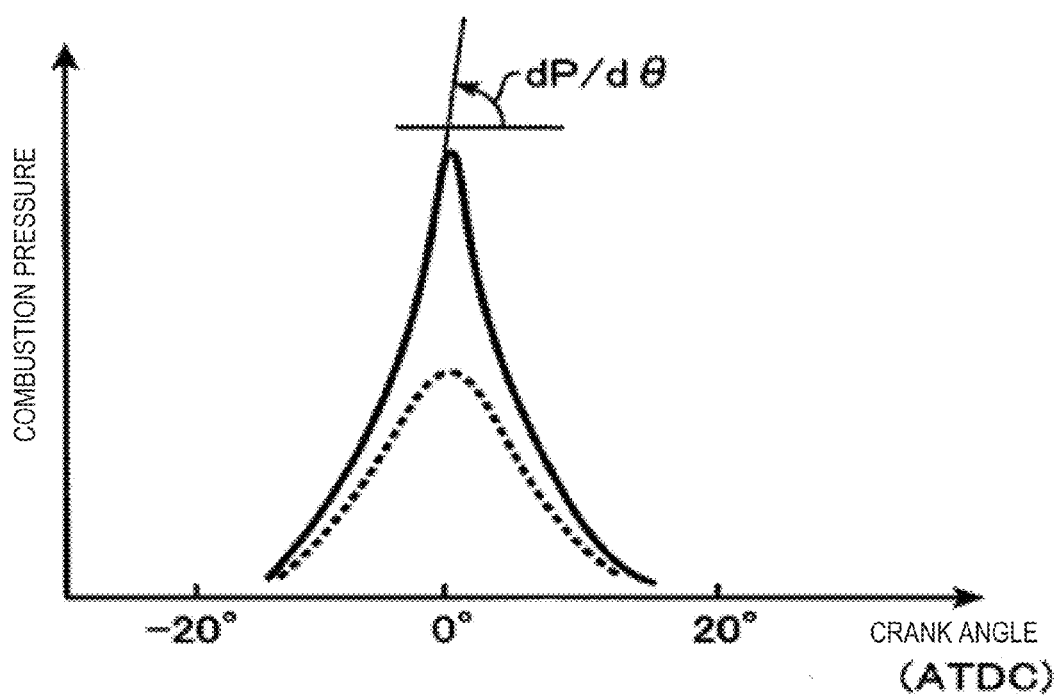
FIG. 13 is a graph showing an increasing rate of the combustion pressure produced when the package fuel injection is carried out in a high load range.

However, in the second HCCI range (A2), more specifically in a higher load side range thereof, when the combustion pressure by compressed self ignition rises rapidly, there is a possibility that a relatively loud combustion noise similar to a diesel knock may occur, for example. That is, in the second HCCI range (A2) which is set at the higher load side than the first HCCI range (A1), by injecting a large amount of fuel from the injector 10 according to the load, the total energy produced by the combustion will be relatively large and such large combustion energy arises in a short period of time, thereby it can be considered that, as shown by a solid line waveform in FIG. 13, the combustion pressure inside the cylinder goes up rapidly. Then, an increasing rate dP/dθ of the combustion pressure which indicates how much the combustion pressure rises during 1 degree of crank angle will be quite large compared with the combustion in the first HCCI range (A1) (shown by a dashed line), and there is a possibility that the loud combustion noise resulting from the increase in such a pressure increase rate may occur.

Of course, in this embodiment, in order to suppress the occurrence of such combustion noises, the effective compression ratio is configured to be reduced gradually from 18 to 15 in the second HCCI range (A2) (refer to FIG. 5); however, there is a possibility that the combustion noise may still occur because the increasing rate (dP/dθ) of the combustion pressure will not fully be suppressed only by reducing the effective compression ratio in such a manner.

Therefore, in this embodiment, at least in the higher load side range of the second HCCI range (A2), fuel injection from the injector 10 is performed in two or more steps to successively cause relatively low energy combustions, thereby reducing the increasing rate (dP/dθ) of the combustion pressure as a whole.

Next, the above divided fuel injections is described in detail, and before that, a combustion form in the first HCCI range (A1) where compressed self ignition are made by a single time of fuel injection is described.

Figure 8A:
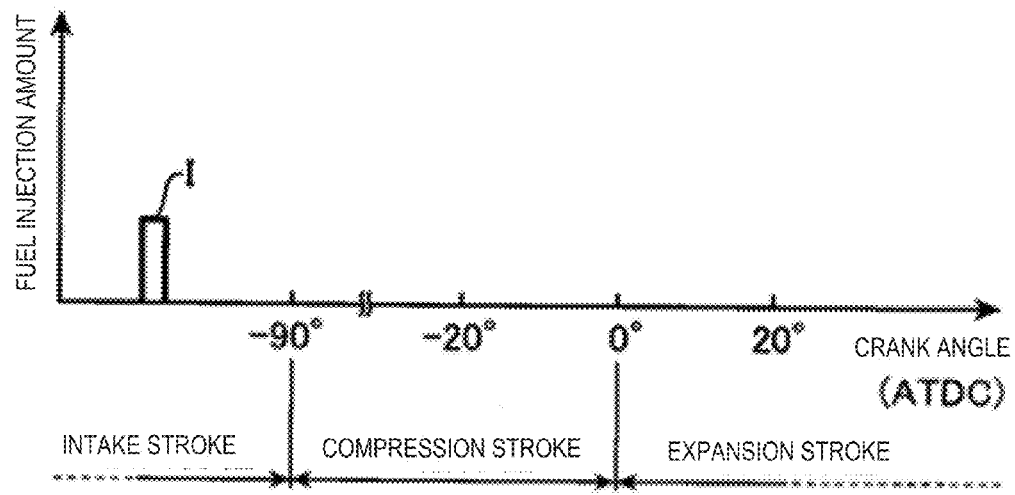
FIGS. 8A and 8B are graphs showing a change in a combustion pressure produced when a given amount of fuel is injected once, where
Figure 8B:
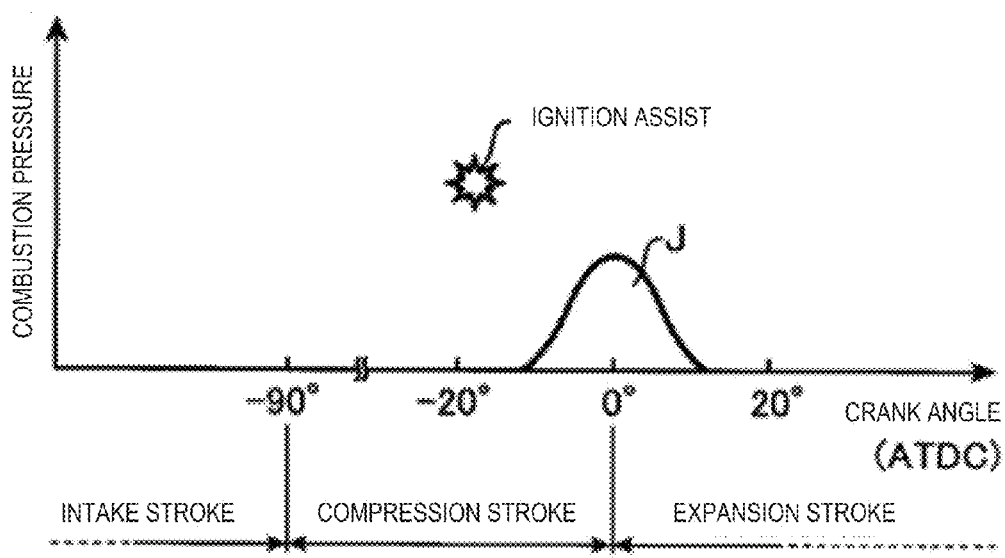

FIGS. 8A and 8B are graphs showing changes in fuel injected in the first HCCI range (A1) and a combustion pressure caused by the change in fuel, by a relationship with a crank angle after a compression top dead center. As shown in these graphs, in the first HCCI range (A1), a given amount of fuel is injected once during an intake stroke ("I" in FIG. 8A), and the fuel is fully agitated and mixed with air over a subsequent predetermined crank angle range to generate uniform air fuel mixture in the combustion chamber 5. Then, the generated air fuel mixture is made to be at a high pressure and a high temperature to cause combustion by compressed self ignition slightly before a compression top dead center ("J" in FIG. 8B), and the combustion pressure rises over a predetermined range crossing the compression top dead center. At this time, if needed (specifically, at the low load side of the first HCCI range (A1)), the ignition assistance by the spark plug 11 is performed in order to assist self-ignition of the air fuel mixture.

Figure 9A:
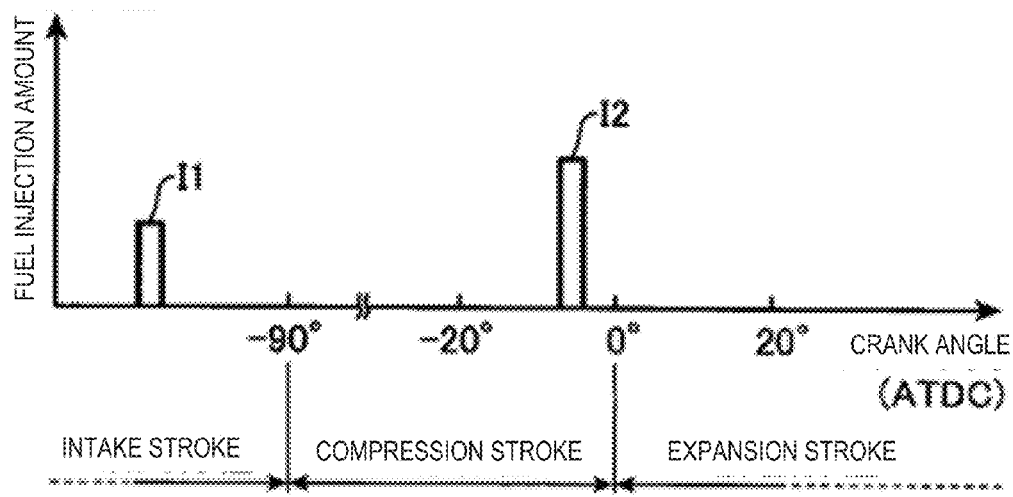
FIGS. 9A and 9B are graphs showing a change in the combustion pressure produced when the fuel injection is divided into two steps, where
Figure 9B:
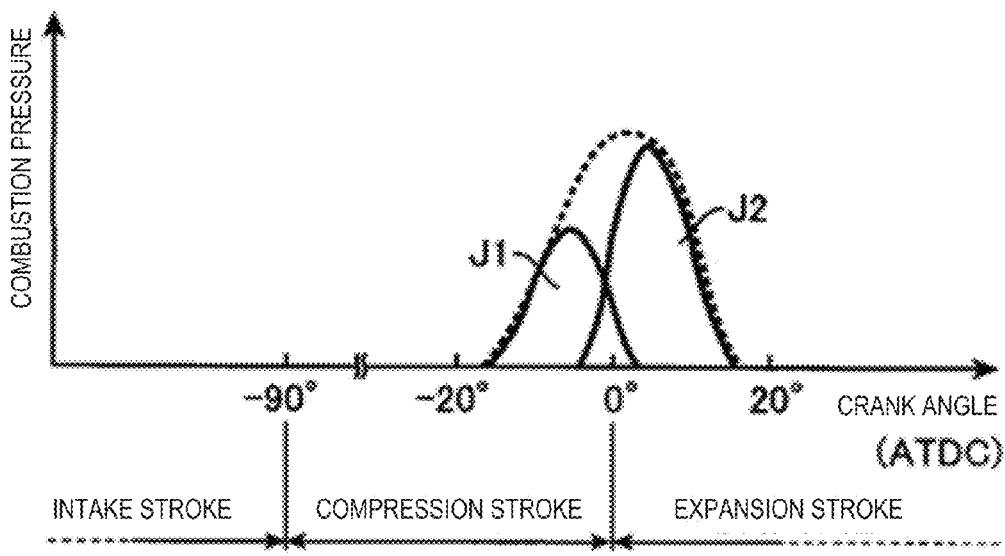

On the other hand, in the second HCCI range (A2), because the fuel injection amount increases specifically in the higher load side range, large energy combustion will occur in a short period of time if the fuel is injected at a time as shown in FIG. 8A, thereby causing a combustion noise. Therefore, at least in the higher load side range of the second HCCI range (A2), as shown in FIGS. 9A and 9B, the fuel is injected dividedly over two or more steps to successively perform two or more compressed self ignitions. Note that, in FIGS. 9A and 9B, an example where the fuel injection is performed in two steps is shown.

That is, in the example of FIGS. 9A and 9B, a small amount of fuel which is less than a required fuel injection amount (a fuel injection amount in accordance with the engine load) is first injected once during an intake stroke ("I1" in FIG. 9A). Then, combustion by compressed self ignition with a low peak pressure corresponding to this occurs before a compression top dead center ("J1" in FIG. 9B). Next, corresponding to the timing where the first combustion by compressed self ignition (J1) occurs, a larger amount of fuel than the first fuel injection (I1) is supplied by a second fuel injection (I2). Thereby, combustion by compressed self ignition (J2) of which peak pressure is higher than the first combustion by compressed self ignition (J1) occurs successively after the first combustion.

Note that, as described above, an operation of performing the second fuel injection (I2) is realized by a control of the ECU 50 based on the detection value of the inside-cylinder pressure sensor 63 corresponding to a timing where the first combustion by compressed self ignition (J1) occurs. That is, because the pressure of the combustion chamber 5 will rise momentarily when the first combustion by compressed self ignition (J1) occurs, this pressure rise is detected by the inside-cylinder pressure sensor 63. Then, the ECU 50 (specifically, its injector control means 52) which received the detection signal from the inside-cylinder pressure sensor 63 instantaneously outputs a drive signal to the injector 10, and a given amount of fuel is injected as the second fuel injection from the injector 10 which received the drive signal. Of course, in order to complete the second fuel injection (I2) before completion of the first combustion by compressed self ignition (J1), an excellent output response to the injector 10 is required; however, in this embodiment, because an injector of electronic control type using a piezoelectric element is used as the injector 10, the above precise fuel injection control can be performed without causing problems.

As shown in FIGS. 9A and 9B, in the second HCCI range (A2), fuel is dividedly injected at two timings during an intake stroke and a compression stroke, respectively, and thereby successively performing two or more combustions by compressed self ignition. Therefore, a pressure distribution similar to the case as if a single combustion of a long combustion period occurs (refer to a dashed line in FIG. 9B) can be obtained, it can effectively prevent a combustion noise generated by the combustion pressure rising rapidly, while securing a proper engine output according to the load by producing a large combustion energy, as a whole.

However, there may be a case where the noise control effect is not fully acquired for example in the maximum load side range of the second HCCI range (A2) (a range near the SI range (B)) only by dividing the fuel injection into two steps as shown in FIGS. 9A and 9B. Therefore, in such a case, the dividing number of the fuel injection may be further increased.

Figure 10A:
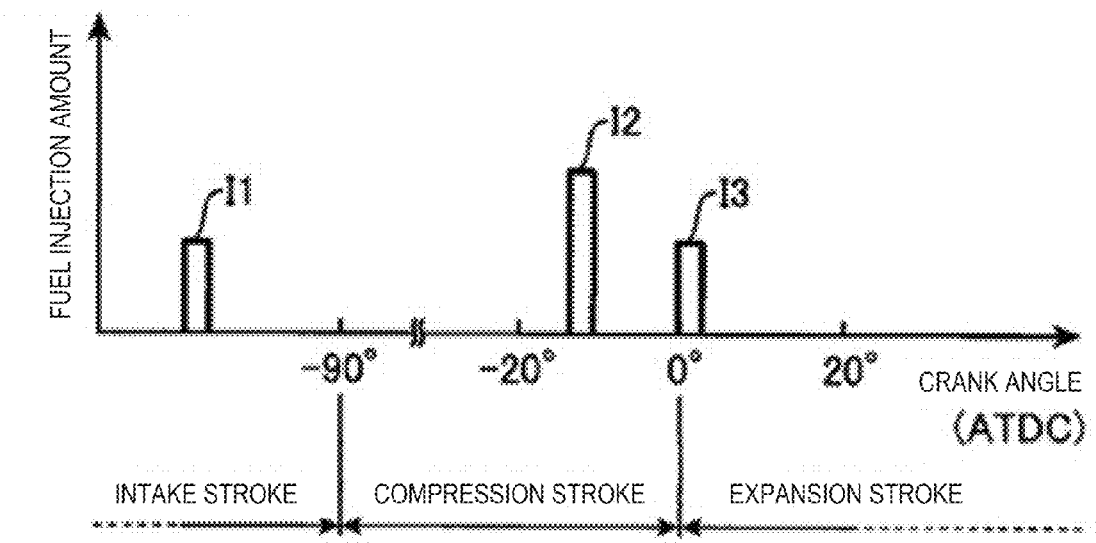
FIGS. 10A and 10B are graphs showing a change in the combustion pressure produced when the fuel injection is divided into three steps, where
Figure 10B:
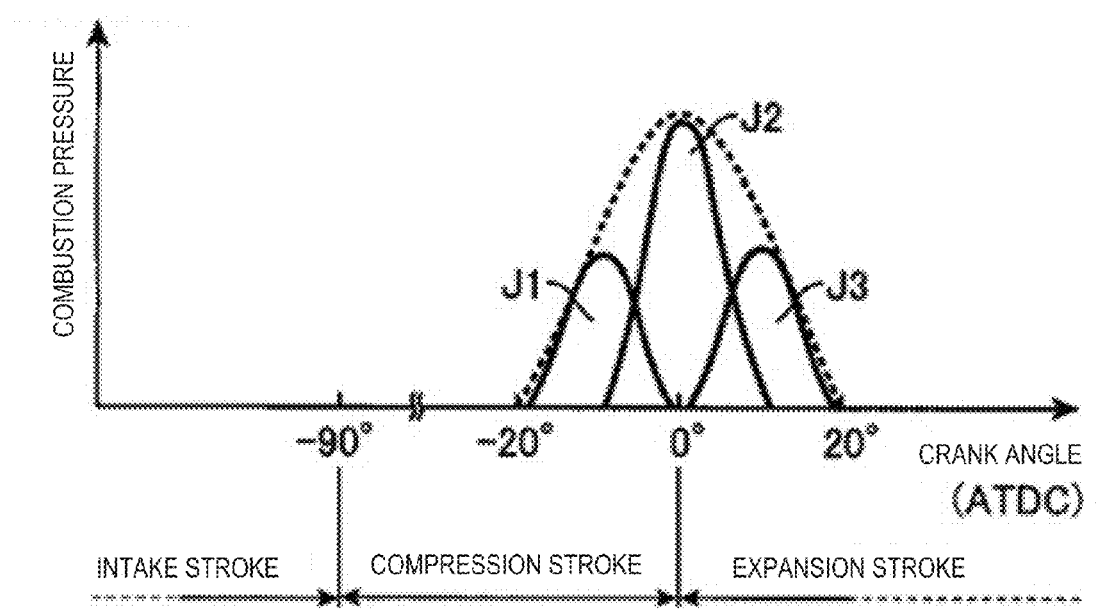

In FIGS. 10A and 10B, combustions by compressed self ignition (J1, J2, J3) which occur when the fuel injection is divided into three steps (I1, I2, I3) are illustrated. Thus, when the divided number is increased to three times, greater combustion energy than the case where it is divided into two can be secured, and a rapid rise of the combustion pressure is suppressed more effectively. Therefore, even when the second HCCI range (A2) is considerably expanded to the higher load side, combustion noises can be effectively prevented while securing a higher engine output according to the load, by increasing the divided number of the fuel injection with increase of the load.

Note that, in the example of FIGS. 9 and 10, in order to suppress the rapid rise of the combustion pressure by the compressed self ignition (that is, combustion is made slower), the divided injection where fuel is injected at two or more timings during a compression stroke is performed. However, the method of slowing the combustion is not limited to this. For example, even in a case where a single fuel injection is performed as shown in FIGS. 8A and 8B, compressed self ignition will be relatively difficult to occur if the injection timing of fuel is retarded, thereby elongating the combustion period by slowing the combustion to some extent. Of course, when combustion is made slower by retarding such an injection timing, the effect acquired will be lower than the case where the divided injection of fuel is carried out; however, it is possible to slow combustion by retarding the injection timing up to a certain load range.

As shown in FIGS. 9A and 9B, and 10A and 10B, when fuel is dividedly injected at two or more steps, the fuel injection (I1) performed before the first combustion by compressed self ignition (J1) may not necessarily occur at a single step and may also be divided into two or more steps. Hereinafter, also assuming such an injection is performed, a combustion injection (I1) performed before the first combustion by compressed self ignition (J1) is referred to as a "first stage injection," and a combustion injection ("I2" in FIG. 9A, or "I2" and "I3" in FIG. 10A) performed after the first combustion by compressed self ignition (J1) is referred to as a "last stage injection."

Here, in order to increase the engine output with increase of the load, it is necessary to increase the fuel injection amount according to the load. However, when dividing the fuel injection into two or more steps as described above, it is desirable that the fuel injection amount by the first stage injection (I1) is maintained substantially constant regardless of the load.

That is, in the second HCCI range (A2), because the supercharge amount is increased with increase of the load and accordingly the amount of intake air which flows into the combustion chamber 5 increases, if a fuel injection amount by the first stage injection (I) (first stage injection amount) is made constant, the air fuel ratio based on the first stage injection amount will be leaner as the load becomes higher. Thereby, an amount of heat generated by the first combustion by compressed self ignition (J1) will decrease, and the temperature and the pressure of the combustion chamber 5 when performing the last stage injection (for example, "I2" in FIG. 9A) are suppressed. As a result, in the second and later combustions by compressed self ignition (for example, "J2" in FIG. 9A) based on the last stage injection, it can suppress its reaction rate from becoming rapid; thereby generation of the combustion noises by rapid rise of the combustion pressure can be effectively prevented.

However, because preventing the combustion noises by the divided fuel injection has a limit, if the combustion by compressed self ignition continues to near the maximum engine load range where a larger amount of fuel needs to be injected, more intense combustion occurs to cause a loud combustion noise. Therefore, in this embodiment, as shown in FIG. 4 and the like, combustion controlled by jump spark ignition is performed in the SI range (B) set near the maximum engine load range to prevent generation of the above combustion noise.

Finally, the combustion form in the SI range (B) is described briefly. In the SI range (B), air fuel mixture is forcibly ignited to burn by ignition by jump sparks from the spark plug 11. However, as shown in FIG. 6, also in the SI range (B) near the maximum engine load range, the excess air ratio λ with respect to the theoretical air fuel ratio is still at λ≈2, and there is a possibility that a misfire may occur by the typical jump spark ignition.

Therefore, in this embodiment, multiple ignitions where electrical discharges are successively carried out at two or more steps from the spark plug 11 in the SI range (B). Specifically, successive spark discharges where a spark is further driven into a spark discharged from the spark plug 11 are performed to increase the energy of a flame core and the combustion is caused to occur reliably.

Further, as shown in FIG. 5, the effective compression ratio is lowered to about 14 in the SI range (B), unlike the cases of the first and second HCCI ranges (A1) and (A2). Thereby, because the excessive increase of the inside-cylinder temperature and pressure is suppressed, an abnormal combustion, such as a knock, can be prevented, while positively achieving the ignition of air fuel mixture by the multiple ignitions.

Note that a single time is fundamentally sufficient for the number of fuel injections in the SI range (B); however, for example in the maximum engine load operation, the fuel injection may be divided into two or more steps similar to the case of the second HCCI range (A2). Thus, if the fuel injection is divided, because the injected fuel is efficiently mixed with intake air inside the cylinder and evaporation of the fuel is stimulated, an effect that the air fuel mixture is cooled by the evaporation latent heat to prevent abnormal combustions, such as knocks, can be expected.

In addition, because strong turbulence is generated inside the cylinder associated with the fuel injection, an effect that a flame propagation speed improves to prevent the abnormal combustion, such as a knock, can also be expected.

Figure 11:
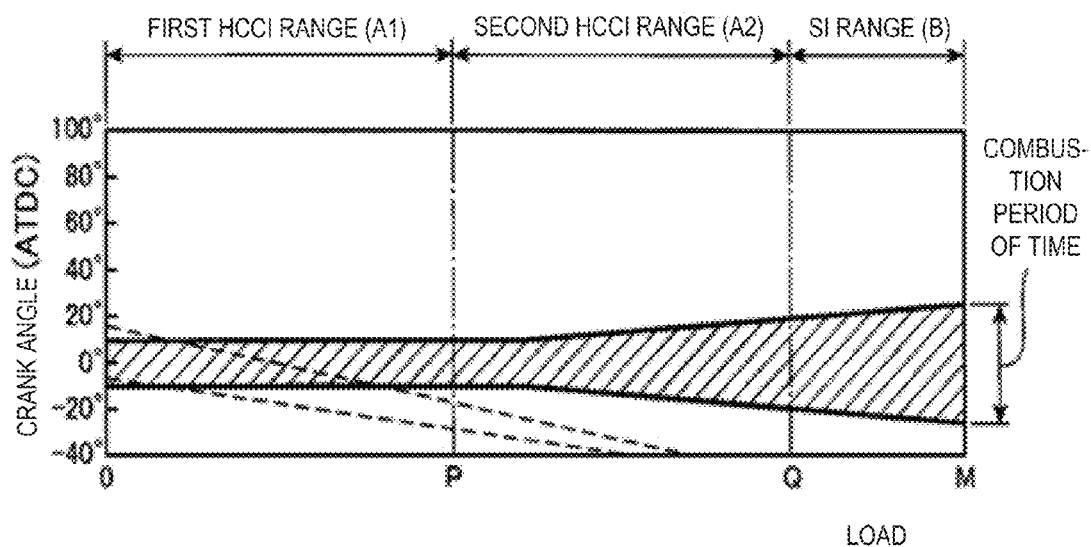
FIG. 11 is a graph showing a combustion form realized by control of the compression ratio, the air fuel ratio, the supercharge amount, the injection timing as shown in FIGS. 6 to 10, by a relationship between an engine load and a combustion period.

FIG. 11 is a graph showing a form of combustion realized by the control of the compression ratio, air fuel ratio, supercharge amount, injection timing or the like in accordance with each engine operating range (A1, A2, B) described above by a relationship between the engine load and the combustion period. According to this graph, combustion occurs within a predetermined crank angle range crossing a compression top dead center, regardless of the engine load. It is found that, particularly in the middle and high engine load ranges (the second HCCI range (A2) and the SI range (B)), the divided injections, the multiple ignitions or the like are performed and the effective compression ratio is lowered to slow down the combustion, thereby the combustion period is delayed. Therefore, the combustion pressure increasing rate (dP/dθ) is reduced to effectively suppress the combustion noise.

On the other hand, a range indicated by a dashed line in FIG. 11 shows a combustion period when conventional combustion by compressed self ignition continues to the high load range. Note that the conventional combustion by compressed self ignition refers to self-ignition of air fuel mixture by providing in an exhaust stroke a so-called a negative overlap period where both the intake and exhaust valves 8 and 9 are closed to cause a given amount of combusted gas to remain in the combustion chamber 5 (internal EGR), and fuel is directly injected to the combustion chamber 5 of which temperature becomes high by such an internal EGR. In the combustion by compressed self ignition using such an internal EGR, a combusting reaction will be sensitive as the load increases, and the combustion will be completed within a short period of time. Then, because the increasing rate of the combustion pressure will be too high, and this causes a possibility that loud combustion noise may occur or the maximum combustion pressure may become too high to deteriorate a reliability of the engine, there is a problem that the combustion by compressed self ignition is only performed in a low engine load range. On the other hand, in this embodiment, because the combustion by compressed self ignition is controlled by suitably adjusting the effective compression ratio, the fuel injection timing or the like without using internal EGR, the range where the engine can be operated by the combustion by compressed self ignition (HCCI range (A)) can be expanded to a higher load side, while effectively preventing problems, such as generation of the combustion noise, fall of the engine reliability or the like.

As described above, in the direct injection engine with the supercharger of this embodiment, a lean air fuel ratio of λ≈2 is realized in the second HCCI range (A2) where the load is relatively high in the HCCI range (A), by supercharging relatively a large amount of air to carry out combustion by the compressed self ignition under such a lean air fuel ratio. Therefore, by making the air fuel mixture have a high temperature and a high pressure to some extent by using the supercharging, the air fuel mixture can be combusted by reliably causing it to self-ignite also under the lean air fuel ratio, and a sufficient engine output can be properly secured by an increase of the supercharge amount according to the load. In addition, by performing the divided fuel injection in the second HCCI range (A2), combustion can be slowed down in a situation where rapid combustion by compressed self ignition occurs easily because the load is relatively high. Therefore, it can be effectively prevented that generation of the combustion noise (a loud noise similar to a diesel knock) due to the rapid increase in the combustion pressure or the reliability fall of the engine due to the increase in the maximum combustion pressure.

Further, by reliably causing the combustion by compressed self ignition while achieving securing of the engine output, prevention of the combustion noise or the like in an operating range including the second HCCI range (A2), there are advantages that the range where the engine can be operated by combustion by compressed self ignition (HCCI range (A)) can be expanded, and as a result, the fuel consumption can be effectively reduced, the combusting temperature of air fuel mixture is suppressed low, to reduce an amount of $NO_x$ discharged from the combustion chamber 5.

In addition, in this embodiment, in the HCCI range (A) where combustion by compressed self ignition is performed, the effective compression ratio is set to a value quite higher (about 15 or more) than that of a typical gasoline engine, and the combustion by compressed self ignition is performed in the combustion chamber 5 which is made to have a high temperature and a high pressure. Therefore, there is an advantage that the combustion by compressed self ignition can be more reliably caused under a lean air fuel ratio of λ=2 or more.

Specifically, when the combustion by compressed self ignition is performed in a state where the compression ratio is set considerably high and supercharge is performed, as described above, for example, because the internal EGR where a given amount of combusted gas is caused to remain in the combustion chamber 5 is not necessary to be performed as a measure for facilitating the compressed self ignition, there are advantages that a ratio of specific heat of the air fuel mixture does not fall and a greater fuel consumption improvement effect can be acquired.

That is, assuming that the effective compression ratio is c and the ratio of specific heat of air fuel mixture is κ, a theoretical thermal efficiency η of an Otto cycle engine can be expressed by the following equation (1).

$$\eta=1-(1/\epsilon^{\kappa-1}) \quad (1)$$

Therefore, if the effective compression ratio ε is constant, the theoretical thermal efficiency η will be higher as the ratio of specific heat κ of air fuel mixture becomes higher, thereby it can be considered that the fuel consumption improves.

The ratio of specific heat κ is smaller as there are more atoms which constitute a gas molecule. For example, a ratio of specific heat κ of a 3-atom molecule, such as $CO_2$, is smaller than that of a 2-atom molecule, such as $N_2$ or $O_2$, mainly contained in air (fresh air). For this reason, if a large amount of combusted gas is caused to remain in the combustion chamber 5 by internal EGR, many 3-atom molecules, such as $CO_2$, generated by combustion will be contained in the air fuel mixture inside the combustion chamber 5, and the ratio of specific heat κ of the air fuel mixture will fall for the amount of 3-atom molecules. Then, the theoretical thermal efficiency η by the equation (1) falls, and the fuel consumption will get worse. On the other hand, in this embodiment, because it is not necessary to use an internal EGR for compressed self ignition, the fall of the ratio of specific heat κ is not caused; thereby a greater fuel consumption improvement effect can be expected.

In addition, in this embodiment, as shown in FIGS. 8A and 8B, 9A and 9B, and 10A and 10B, a single combustion by compressed self ignition is caused in the first HCCI range (A1) including a low engine load range of the HCCI range (A), and in the second HCCI range (A2) at a higher load side of the first HCCI range (A1), two or more successive combustions by compressed self ignition are performed so that a fuel injection is divided. Therefore, performing two or more successive combustions so that a fuel injection is divided in a relatively higher load range while stabilizing combustions in a low load range, results in an advantage that a high engine output according to the load can be properly secured while preventing generation of combustion noise by slowing down the combustion as a whole.

Of course, when a fuel injection is divided into two or more steps in the second HCCI range (A2) (particularly, in the last stage injection), the fuel needs to be injected so as to be distributed in a very short period of time. However, when the fuel is injected at a high pressure from the multiple-nozzle injector 10 so that the fuel is microatomized as described above, the fuel can be distributed, evaporated and atomized in a shorter period of time. Therefore, there are advantages that the divided fuel injection can be reliably combusted each time, and a combustion control ability in the second HCCI range (A2) can be improved more effectively.

In addition, in this embodiment, because the multiple-nozzle injector 10 is arranged near the center of the upper part of the combustion chamber 5, it is advantageous to uniformly distribute the fuel inside the combustion chamber 5, and there is an advantage that flammability of air fuel mixture can be more effectively enhanced to improve fuel consumption and more effectively reduce $NO_x$.

Further, in this embodiment, in the first HCCI range (A1) which includes a low engine load range, an air fuel ratio is set to λ≈2 to 3, and an effective compression ratio is raised to about 18 which is substantially the same as a geometric compression ratio. Therefore, compressed self ignition combustion can be reliably performed in the combustion chamber 5 which is made to have a high temperature and a high pressure by a high compression ratio about the same as that of a diesel engine, also under a very lean air fuel ratio of λ≈2 to 3, and there is an advantage that the fuel consumption and the amount of $NO_x$ discharge in a low load range can be reduced more effectively.

On the other hand, when performing combustion by compressed self ignition in the second HCCI range (A2) at a higher load side than the first HCCI range (A1), the effective compression ratio is gradually reduced from 18 to about 15 with increase of the load. Therefore, by reducing the maximum values of the inside-cylinder temperature and pressure in proportion to the compression ratio, there is an advantage that combustion by compressed self ignition in a range where the load is relatively high is made slower to more effectively prevent generation of the combustion noise, together with the effect by the divided fuel injection described above.

Particularly, in this embodiment, the operation of reducing the effective compression ratio from 18 to about 15 in the second HCCI range (A2) is performed by delaying the close timing of the intake valve 8 with respect to an intake bottom dead center. Therefore, there is an advantage that the engine compression ratio can be properly adjusted with a relatively simple configuration where only the close timing of the intake valve 8 is changed.

For example, changing an engine geometric compression ratio by changing a stroke amount of the piston 2 (a position at a compression top dead center) may also be considered. By configuring in this way, there arises a problem that the structure will be complicated because it will be necessary to provide various link mechanisms or the like around the crankshaft 3 as a mechanism for enabling a change in a stroke amount of the piston 2. On the other hand, in this embodiment, there is an advantage that the close timing of the intake valve 8 is delayed with respect to an intake bottom dead center by the compression ratio adjustment means which is constituted by the VVT 42 and the valve timing control means 51 to adjust the compression ratio, thereby the compression ratio can be adjusted with an easier configuration.

Note that, in this embodiment, in the first HCCI range (A1) set at a low engine load side, the ignition assistance which auxiliarly carries out spark discharges from the spark plug 11 is performed to semi-forcibly cause compressed self ignition of air fuel mixture under the conditions of λ≈2 to 3 and the effective compression ratio of about 18. However, it may be configured so that the compressed self ignition occurs without the ignition assistance by further raising the effective compression ratio in the first HCCI range (A1).

For example, it can be considered that, if the geometric compression ratio is set to about 20 and the effective compression ratio in the first HCCI range (A1) is gradually reduced from 20 to about 18 with increase of the load, the compressed self ignition will occur without the ignition assistance described above.

Further, even if the ignition assistance is performed similar to this embodiment, it may be difficult to cause the compressed self ignition in an operating range near no-load where a very lean air fuel ratio of λ≈3 is set. Therefore, in such an operating range, the combustion form is changed to stratified combustion to locally form a rich air fuel ratio near the spark plug 11, thereby forcibly igniting air fuel mixture by jump spark ignition.

Further, in this embodiment, in order to cause combustion by jump spark ignition to be performed under a lean air fuel ratio of λ≈2 in the SI range (B) set near the maximum engine load range, the multiple ignitions where sparks are successively discharged at two or more steps from the spark plug 11 are performed. However, in order to realize lean combustion in a high engine load range, the electric discharges of the spark plug 11 may supply energy to air fuel mixture as large as possible, and the specific method for this purpose is not limited to the above multiple ignitions.

Figure 14:
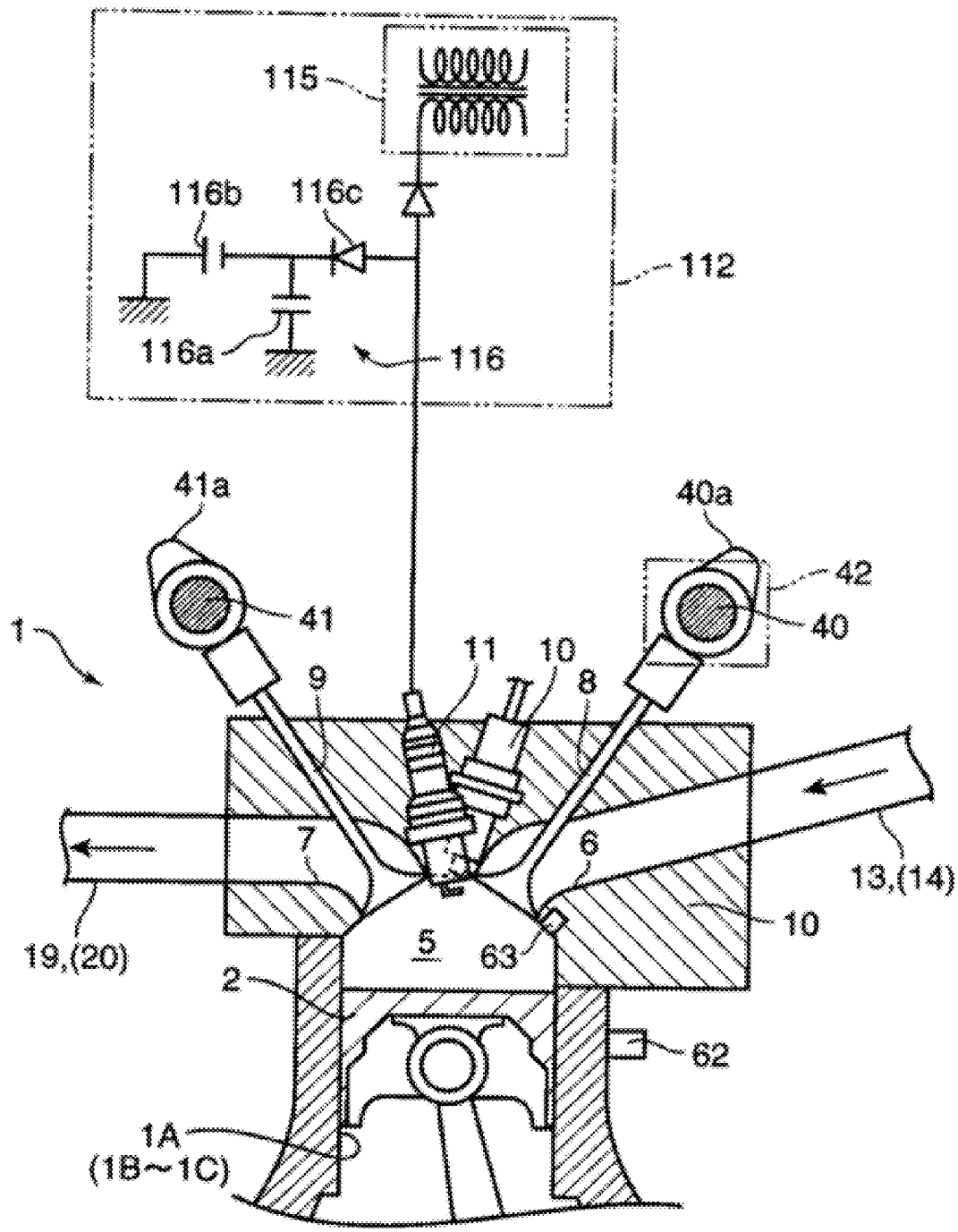
FIG. 14 is a view illustrating another embodiment of the present invention.

For example, it is possible to adopt plasma jet ignition put in practical use in airplane jet engines. FIG. 14 is a view showing an example configuration of a spark plug 11 and an ignition circuit device 112 that perform such plasma jet ignition.

The ignition circuit device 112 includes an ignition coil 115 that supplies electric power for spark discharge to the spark plug 11, and a plasma discharge circuit 116 for plasma generation connected to a secondary side of the ignition coil 115. The plasma discharge circuit 116 has a high-voltage power supply 116a that is constituted with a voltage increase circuit capable of generating a high voltage of about 600V, for example, a capacitor 116b for storing electric charges supplied from the high-voltage power supply 116a, and a diode 116c.

When performing plasma jet ignition by the power supply from the ignition circuit device 112, first, current is cut at a primary side of the ignition coil 115 like the typical jump spark ignition, a high voltage which reaches tens of thousands of volts is generated at the secondary side. Then, associated with this, at the same time as spark discharges occur between electrodes of the spark plug 11, an electric charge is emitted at a stretch from the capacitor 116b of the plasma discharge circuit 116. Then, very large electric discharge energy is instantaneously supplied between the electrodes of the spark plug 11, and plasma generated by this will be discharged into the combustion chamber 5.

In this way, because the plasma discharged into the combustion chamber 5 is a radical species with high energy and is highly active, it is excellent in ignitability of an air fuel mixture. If such plasma jet ignition is used, the ignitability of the air fuel mixture in the SI range (B) will be improved more reliably.

Further, in the embodiment, as shown in FIGS. 1 and 2, the spark plug 11 is provided to each of the cylinders 1A-1D, but in order to further increase the ignitability, two or more spark plugs 11 may be provided to each cylinder. For example, in the example of FIGS. 1 and 2, although the spark plug 11 is provided near the center of the upper part of the combustion chamber 5, another spark plug may be added so as to oppose to the combustion chamber 5 from the side of the intake side, for example.

Further, although the electronic control type injector using a piezoelectric element is provided as the injector 10 in this embodiment, it may be a high-speed solenoid type injector as long as it can switch ON/OFF with an excellent response.

Further, although the excess air ratio $\lambda$ with respect to a theoretical air fuel ratio is maintained constant at $\lambda \approx 2$ in the second HCCI range (A2) in this embodiment, the excess air ratio $\lambda$ in the second HCCI range (A2) may be set at a value larger than $\lambda = 2$ by a given amount, and the excess air ratio $\lambda$ may be variably set within a range greater than $\lambda = 2$, depending on the supercharge capability and other capabilities of the large-sized supercharger 25 and the small-sized supercharger 30.

Further, in this embodiment, by setting the close timing of the intake valve 8 later with respect to an intake bottom dead center in the second HCCI range (A2) and the SI range (B), the engine effective compression ratio is reduced below the geometric compression ratio (about 18 in this embodiment). In order to lower the engine effective compression ratio, the close timing of the intake valve 8 may be shifted with respect to an intake bottom dead center by a given amount, and the shifting direction may be a retard side or an advance side. For example, even if the close timing of the intake valve 8 is advanced to an intake bottom dead center contrary to the above embodiment, the effective compression ratio will fall because the intake air amount is reduced by an amount according to the advance.

Further, in this embodiment, the excess air ratio with respect to the theoretical air fuel ratio is reduced gradually from $\lambda \approx 3$ to $\lambda \approx 2$ in the first HCCI range (A1) including a low engine load range with increase of the load, and the excess air ratio $\lambda$ is maintained at $\lambda \approx 2$ in the second HCCI range (A2) and the SI range (B) at a higher load side than the first HCCI range (A1), thereby maintaining a lean air fuel ratio of $\lambda \approx 2$ or more over the entire engine load. However, as described above, such a lean air fuel ratio can fundamentally be maintained while the engine is warm and, thus, during a cold operation where ignitability of the engine is bad, $\lambda$ may be reduced below 2, if needed, to change the air fuel ratio to a rich side. Further, even if the engine is in a warm state, in a situation where a temperature of an exhaust emission control catalyst, which is not illustrated, provided to the exhaust passage 19 has not reached an activation temperature, in order to make the catalyst be active to maintain its purification performance, the air fuel ratio may be temporarily changed to a rich side to raise the temperature of exhaust gas.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling an internal combustion engine system having an internal combustion engine, a fuel injector which directly injects fuel into a combustion chamber of said internal combustion engine, and a supercharger which is operatively coupled to a compressor and a turbine and supercharges air into said combustion chamber, the method comprising:

providing an engine operating load range of the internal combustion engine having a low-load HCCI range extending from zero torque to a first torque threshold, a high-load HCCI range extending from the first torque threshold to a higher second torque threshold, and a spark ignition (SI) range extending from the second torque threshold;

injecting fuel into said combustion chamber multiple times so that a first part of the fuel is self ignited and a last part of the fuel being injected during a compression stroke or later in a cylinder cycle, when a desired torque of said internal combustion engine system is in the high-load HCCI range and when the air fuel ratio in said combustion chamber is leaner than the stoichiometric air fuel ratio;

charging air when the desired torque is between the first torque threshold and the second torque threshold;

increasing a pressure of air which said supercharger charges into said combustion chamber as an amount of fuel injected into said combustion chamber during a cylinder cycle increases when the desired torque is between the first torque threshold and the second torque threshold, such that a supercharge air amount at the second torque threshold is greater than a supercharge air amount at the first torque threshold, an air fuel ratio in said combustion chamber at the first torque threshold is substantially equal to an air fuel ratio in said combustion chamber at the second torque threshold, and the air fuel ratio decreases between zero torque and the first torque threshold in the low-load HCCI range; and igniting fuel injected in said combustion chamber with a spark made by a spark plug, when a desired torque for said internal combustion engine system is between the second torque threshold and above, wherein an effective compression ratio at the first torque threshold is configured to be greater than an effective compression ratio at the second torque threshold and decreases therebetween.

2. The method as described in claim 1, wherein said supercharger has a capacity of supercharging into the combustion chamber twice or more of an air mass at an atmospheric pressure, and the method further comprising, when a desired torque for said internal combustion engine system is in said high-load range, controlling a total amount of fuel injected during a cylinder cycle so that an excess air ratio is 2 or greater in said combustion chamber.

3. The method as described in claim 2, further comprising:
when a desired torque for said internal combustion engine system is in a low-load range of the HCCI range, which is smaller than said high-load range of the HCCI range, injecting fuel into said combustion chamber so as to complete the fuel injection by a middle stage of a compression stroke at the latest in a cylinder cycle, and causing combustion of the injected fuel by its compression self-ignition.

4. The method as described in claim 3, further comprising controlling an effective compression ratio of said combustion chamber to be 15 or greater when a desired torque for said internal combustion engine system is in said high-load range of the HCCI range.

5. The method as described in claim 4, further comprising:
controlling an air fuel ratio in said combustion chamber to be leaner than a stoichiometric air fuel ratio and making multiple sparks with said spark plug for said ignition of injected fuel when a desired torque is in said SI range.

6. The method as described in claim 4, further comprising:
controlling an air fuel ratio in said combustion chamber to be leaner than a stoichiometric air fuel ratio and making a plasma jet flow from said spark plug for said ignition of injected fuel when a desired torque is in said SI range.

7. The method as described in claim 1, further comprising:
controlling the effective compression ratio of said combustion chamber to be 15 or greater when a desired torque for said internal combustion engine system is in said high-load range of the HCCI range.

8. The method as described in claim 7, further comprising:
controlling an air fuel ratio in said combustion chamber to be leaner than a stoichiometric air fuel ratio and making multiple sparks with said spark plug for said ignition of injected fuel when a desired torque is in said SI range.

9. The method as described in claim 7, further comprising:
controlling an air fuel ratio in said combustion chamber to be leaner than a stoichiometric air fuel ratio and making a plasma jet flow from said spark plug for said ignition of injected fuel when a desired torque for said internal combustion engine system is in said SI range.

10. The method as described in claim 1, further comprising:
controlling an air fuel ratio in said combustion chamber to be leaner than a stoichiometric air fuel ratio and making multiple sparks with said spark plug for said ignition of injected fuel when a desired torque of said internal combustion engine system is in said SI range.

11. The method as described in claim 1, further comprising:
controlling an air fuel ratio in said combustion chamber to be leaner than a stoichiometric air fuel ratio and making a plasma jet flow from said spark plug for said ignition of injected fuel when a desired torque is in said SI range.

12. An internal combustion engine system comprising:
an internal combustion engine with an engine operating load range having a low-load HCCI range extending from zero torque to a first torque threshold, a high-load HCCI range extending from the first torque threshold to a higher second torque threshold, and a spark ignition (SI) range extending from the second torque threshold;
a fuel injector which directly injects fuel into a combustion chamber of said internal combustion engine;
a supercharger which is operatively coupled to a compressor and a turbine and supercharges air into said combustion chamber; and
a controller configured to control:
said fuel injector to inject fuel into said combustion chamber multiple times so that a first part of the fuel is self ignited and a last part of the fuel being injected during a compression stroke or later in a cylinder cycle when a desired torque of said internal combustion engine system is in the high-load HCCI range and when the air fuel ratio in said combustion chamber is leaner than the stoichiometric air fuel ratio;
said supercharger to charge air when the desired torque is between the first torque threshold and the second torque threshold and to increase a pressure of air which said supercharger charges into said combustion chamber as an amount of fuel injected into said combustion chamber during a cylinder cycle increases when the desired torque between the first torque threshold and the second torque threshold, such that a supercharge air amount at the second torque threshold is greater than a supercharge air amount at the first torque threshold, an air fuel ratio in said combustion chamber at the first torque threshold is substantially equal to an air fuel ratio in said combustion chamber at the second torque threshold, and the air fuel ratio decreases between zero torque and the first torque threshold in the low-load HCCI range; and
a spark plug igniting fuel injected in said combustion chamber with a spark, when a desired torque for said internal combustion engine system is between the second torque threshold and above.

13. The method as described in claim 1, further comprising:
when a desired torque of said internal combustion engine system is in said high-load range of the HCCI range, fuel is injected dividedly over two or more steps to successively perform two or more compressed self ignitions, the timing of the second injection being controlled by a controller to correspond to the timing where the first combustion by compressed self-ignition occurs based on a detected pressure rise inside the combustion chamber resulting from the first combustion by compressed self-ignition.

* * * * *